US009032511B2

(12) United States Patent
Morinaga et al.

(10) Patent No.: US 9,032,511 B2
(45) Date of Patent: May 12, 2015

(54) MOBILE INFORMATION TERMINAL AND GRIPPING-FEATURE AUTHENTICATION METHOD

(75) Inventors: Yasuo Morinaga, Chiyoda-ku (JP); Masakatsu Tsukamoto, Chiyoda-ku (JP); Manabu Ota, Chiyoda-ku (JP); Takeshi Higuchi, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/004,298

(22) PCT Filed: Jan. 27, 2012

(86) PCT No.: PCT/JP2012/051750
§ 371 (c)(1),
(2), (4) Date: Sep. 10, 2013

(87) PCT Pub. No.: WO2012/124383
PCT Pub. Date: Sep. 20, 2012

(65) Prior Publication Data
US 2014/0007227 A1    Jan. 2, 2014

(30) Foreign Application Priority Data
Mar. 11, 2011 (JP) .................................. 2011-053806

(51) Int. Cl.
*G06F 21/32* (2013.01)
*G06F 21/31* (2013.01)
*G06F 21/81* (2013.01)
*H04M 1/67* (2006.01)
*G06F 1/32* (2006.01)

(52) U.S. Cl.
CPC ................ *G06F 21/31* (2013.01); *G06F 21/32* (2013.01); *G06F 21/81* (2013.01); *H04M 1/67* (2013.01); *H04M 2250/12* (2013.01);
CPC ... *G06F 1/3206* (2013.01); *G06F 1/3231* (2013.01); *G06F 1/3287* (2013.01); *G06F 2221/2139* (2013.01); *Y02B 60/1289* (2013.01); *Y02B 60/1282* (2013.01)

(58) Field of Classification Search
CPC ....................................................... G06F 21/32
USPC ............................................................ 726/19
See application file for complete search history.

(56) References Cited

U.S. PATENT DOCUMENTS

2009/0203355 A1* 8/2009 Clark ............................ 455/411
2011/0056108 A1* 3/2011 McCord et al. ............. 42/70.01
2011/0197270 A1* 8/2011 Kaufman ......................... 726/7

FOREIGN PATENT DOCUMENTS

JP          2001 142849         5/2001

OTHER PUBLICATIONS

International Search Report Issued Feb. 28, 2012 in PCT/12/051750 Filed Jan. 27, 2012.

*Primary Examiner* — Jason K Gee
(74) *Attorney, Agent, or Firm* — Oblon, McClelland, Maier & Neustadt, L.L.P.

(57) ABSTRACT

A mobile information terminal including a gripping-feature sample acquisition unit to acquire a gripping-feature sample, one or more environmental sensors outputting an environmental signal, a terminal status detector to acquire the environmental signal and detect a terminal status, a template selection unit to select a user authentication template fitting the detected terminal status, a user authentication unit collating the acquired gripping-feature sample with the selected user authentication template and outputting a user authentication result, a user authenticity level monitor that outputs a sensor power source OFF signal when the user authenticity level exceeds a threshold value and outputs a sensor power source ON signal when the user authenticity level falls below the threshold value, and a power source control unit halting energization to a sensor when acquiring the sensor power source OFF signal, and energizing a sensor when acquiring the sensor power source ON signal.

18 Claims, 12 Drawing Sheets

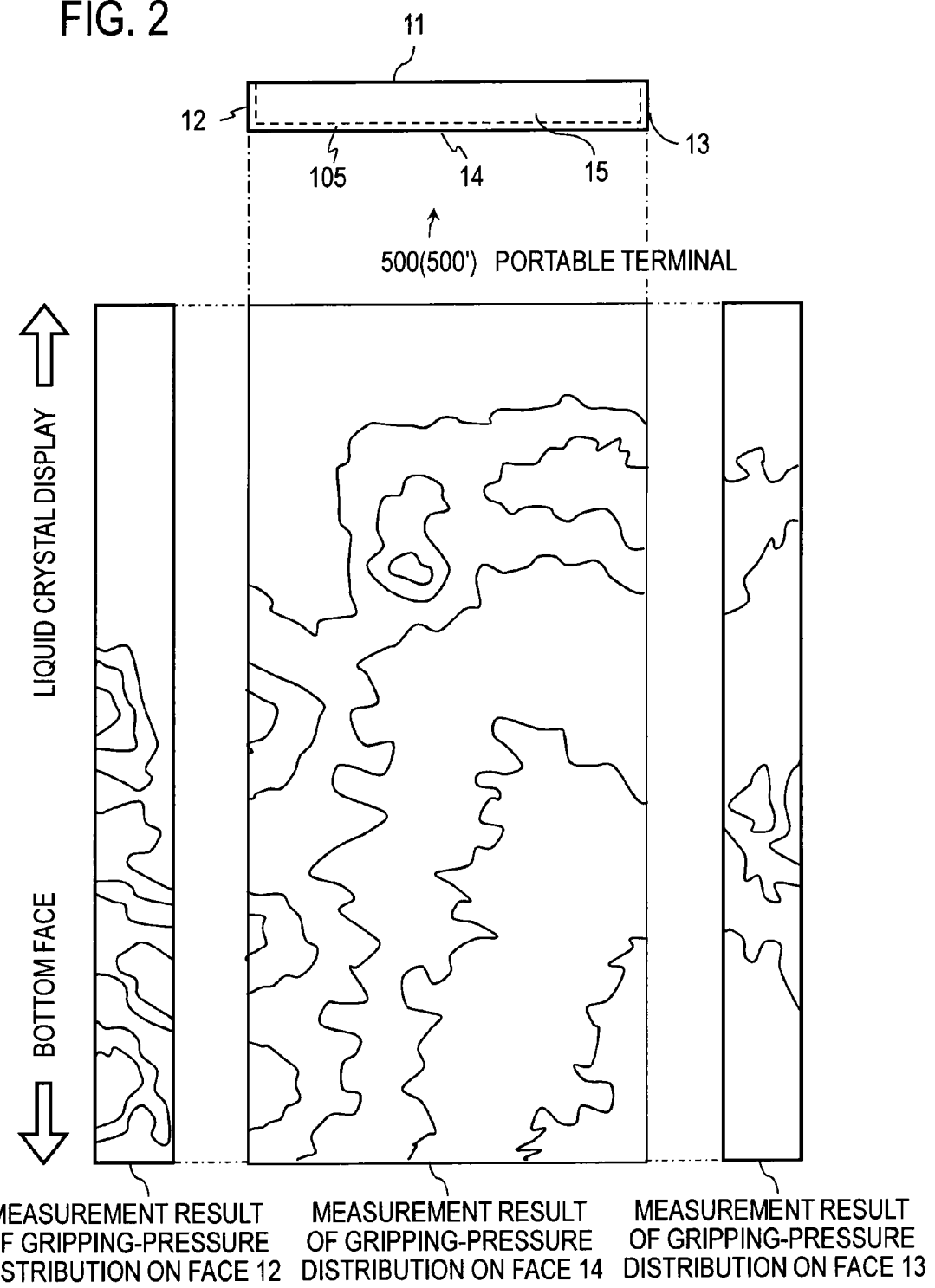

FIG. 4

| No | TERMINAL STATUS LARGE ← INFLUENCE ON GRIPPING-FEATURE → SMALL | | | | |
|---|---|---|---|---|---|
| | ACTIVE STATE APPLICATION | MOTION STATE | OPERATION POSTURE | BRIGHTNESS | POSITION INFO |
| 1 | BROWSER | MOTIONLESS | STANDING POSITION | VERY BRIGHT | SPOT A |
| 2 | MAIL | WALKING | SITTING POSITION | SLIGHTLY BRIGHT | SPOT B |
| 3 | CALL | RUNNING | LATERAL RECUMBENT POSITION | NORMAL | SPOT C |
| 4 | MENU | STAIRS (DESCEND) | SUPINE POSITION | SLIGHTLY DARK | ... |
| 5 | CAMERA | STAIRS (CLIMB) | PROCUMBENT POSITION | VERY DARK | |
| 6 | GAME | TRAIN | ... | ... | |
| ... | ... | ... | | | |

FIG. 6

| SLEEP | PARTIAL SLEEP | | | | AWAKE |
|---|---|---|---|---|---|
| | +APPLI | +MOTION STATE | +OPER POSTURE | +BRIGHTNESS | +POSITION INFO |
| *-*-*-*-* | 1-*-*-*-* | 1-1-*-*-* | 1-1-1-*-* | 1-1-1-1-* | 1-1-1-1-1 |
| | | | | | 1-1-1-1-2 |
| | | | | | 1-1-1-1-3 |
| | | | | 1-1-1-2-* | 1-1-1-2-1 |
| | | | | | 1-1-1-2-2 |
| | | | | | 1-1-1-2-3 |
| | | | | 1-1-1-3-* | 1-1-1-3-1 |
| | | | | | 1-1-1-3-2 |
| | | | | | 1-1-1-3-3 |
| | | | | 1-1-1-4-* | 1-1-1-4-1 |
| | | | | | 1-1-1-4-2 |
| | | | | | 1-1-1-4-3 |
| | | | | 1-1-1-5-* | 1-1-1-5-1 |
| | | | | | 1-1-1-5-2 |
| | | | | | 1-1-1-5-3 |
| | | | 1-1-2-*-* | 1-1-2-1-* | 1-1-2-1-1 |
| | | | | | 1-1-2-1-2 |
| | | | | | 1-1-2-1-3 |
| | | | | 1-1-2-2-* | 1-1-2-2-1 |
| | | | | | 1-1-2-2-2 |
| | | | | | 1-1-2-2-3 |
| | | | | 1-1-2-3-* | 1-1-2-3-1 |
| | | | | | 1-1-2-3-2 |
| | | | | | 1-1-2-3-3 |
| | | | | 1-1-2-4-* | 1-1-2-4-1 |
| | | | | | 1-1-2-4-2 |
| | | | | | 1-1-2-4-3 |
| | | | | 1-1-2-5-* | 1-1-2-4-1 |
| | | | | | 1-1-2-4-2 |
| | | | | | 1-1-2-4-3 |
| | | | 1-1-3-*-* | 1-1-3-5-* | 1-1-2-4-1 |
| | | | | | 1-1-2-4-2 |
| | | | | | ... |

MOBILE INFORMATION TERMINAL AND GRIPPING-FEATURE AUTHENTICATION METHOD

TECHNICAL FIELD

The present invention relates to a mobile information terminal and a gripping-feature authentication method in which a gripping-feature sample when a mobile information terminal is gripped is acquired to perform user authentication.

BACKGROUND ART

In recent years, various services related to money such as electronic money have become widespread along with improvement of functionality of a mobile information terminal. Further, more information related to personal privacy such as address books, mails, pictures, and website browse history has become to be recorded in a mobile information terminal along with the improvement of functionality of the mobile information terminal. In related art, security for information which is handled in a mobile information terminal has been ensured by user authentication (referred to below as log-in authentication) at the start of the use of the mobile information terminal. However, whether or not the user is kept to be an authentic user is not continuously monitored after the user authentication is performed at the start of the use in the log-in authentication. Therefore, when the mobile information terminal goes to another person for some reasons after log-in authentication, the person who has obtained the mobile information terminal can operate the mobile information terminal without newly performing log-in authentication. Such vulnerability in security of log-in authentication has been a problem in related art. To this problem, Patent Literature 1 has disclosed a portable information terminal that acquires grip positions on the portable information terminal which is gripped by a user in user authentication, by a plurality of pressure sensors and invalidates data inputted by a user required for reception of service provision, when a certain level or higher level of change occurs on the positions which are gripped by the user after the user authentication, so as to cancel the effect of the user authentication which has been already performed. Therefore, even if user authentication is performed and the portable information terminal is stolen in the middle of input of data required for reception of service provision, for example, the user authentication and the data which is inputted by the user are invalidated at the point the terminal goes out of the user's hands. Thus, user authentication is required again to receive provision of services after user authentication is invalidated, achieving to effectively prevent abuse by a third person.

PRIOR ART LITERATURE

Patent Literature

Patent literature 1: Japanese Patent Application Laid Open No. 2001-142849

SUMMARY OF THE INVENTION

Problems to be Solved by the Invention

However, it is impossible to perform user authentication while taking into account of difference in the way of gripping by a user when terminal statuses are different from each other in the portable information terminal disclosed in Patent Literature 1. The differences in terminal statuses are such as difference in applications of active states in the terminal (at browsing, mailing, and calling), difference in motion states of a user who uses the terminal (walking, running, and motionless), and the like. In order to perform user authentication while taking the difference in terminal statuses into account, it is necessary to incorporate various types of sensors which acquire environments, to which a mobile information terminal belongs, into the mobile information terminal to detect the difference in terminal status and necessary to always drive the sensors to follow changes in terminal status. In a case in which these sensors are always driven to be used for user authentication, the power consumption amount of the mobile information terminal is largely increased, deteriorating convenience for the user.

Means to Solve the Problems

A mobile information terminal according to the present invention is characterized in that the mobile information terminal acquires a gripping-feature sample when the mobile information terminal is gripped, so as to perform user authentication. The mobile information terminal includes a gripping-feature sample acquisition unit, an environmental sensor group, a terminal status detection unit, a template storage unit, a template selection unit, a user authentication unit, a user authenticity level monitoring unit, and a power source control unit. The gripping-feature sample acquisition unit acquires gripping-feature samples. The environmental sensor group includes one or more sensors that acquire environmental information on an environment to which the mobile information terminal belongs and outputs an environmental signal. The terminal status detection unit acquires the environmental signal and detects one or more combinations of terminal statuses of the mobile information terminal as environmental states. The template storage unit stores a user authentication template that fits to each of the environmental states. The template selection unit acquires the environmental state that is detected, so as to select a user authentication template that fits to the corresponding environmental state. The user authentication unit collates the gripping-feature sample that is acquired with the user authentication template that is selected, and outputs a user authentication result. The user authenticity level monitoring unit acquires the user authentication result, outputs a sensor power source OFF signal when a user authenticity level, which varies in accordance with the user authentication result, varies to exceed a threshold value that is predetermined to correspond to each sensor, and outputs a sensor power source ON signal when the user authenticity level varies to fall below the threshold value. The power source control unit stops energization to a sensor that corresponds to the threshold value when the power source control unit acquires the sensor power source OFF signal, and energizes a sensor that corresponds to the threshold value when power source control unit acquires the sensor power source ON signal.

Effects of the Invention

According to the mobile information terminal of the present invention, the mobile information terminal is capable of energizing or halting energization to a sensor included in an environmental sensor group depending on a user authenticity level, so that when the user authenticity level is high, energization to the sensor is halted, enabling to realize power saving. Further, when the user authenticity level is low, the mobile information terminal is capable of energizing the sensor to detect an environmental state of the mobile information terminal and perform user authentication by using a user authentication template fitting to each environmental state, enabling to realize user authentication following the terminal status.

BRIEF DESCRIPTION OF THE DRAWINGS

FIG. 2 is an example view illustrating gripping-pressure distribution outputted from a pressure sensor array incorporated in the portable terminal according to all the embodiments;

FIG. 4 illustrates terminal statuses which are detected by the portable terminal according to all the embodiments;

FIG. 6 illustrates user authentication templates which fit to terminal statuses of the portable terminal according to all the embodiments;

DETAILED DESCRIPTION OF THE EMBODIMENTS

Figure 1:
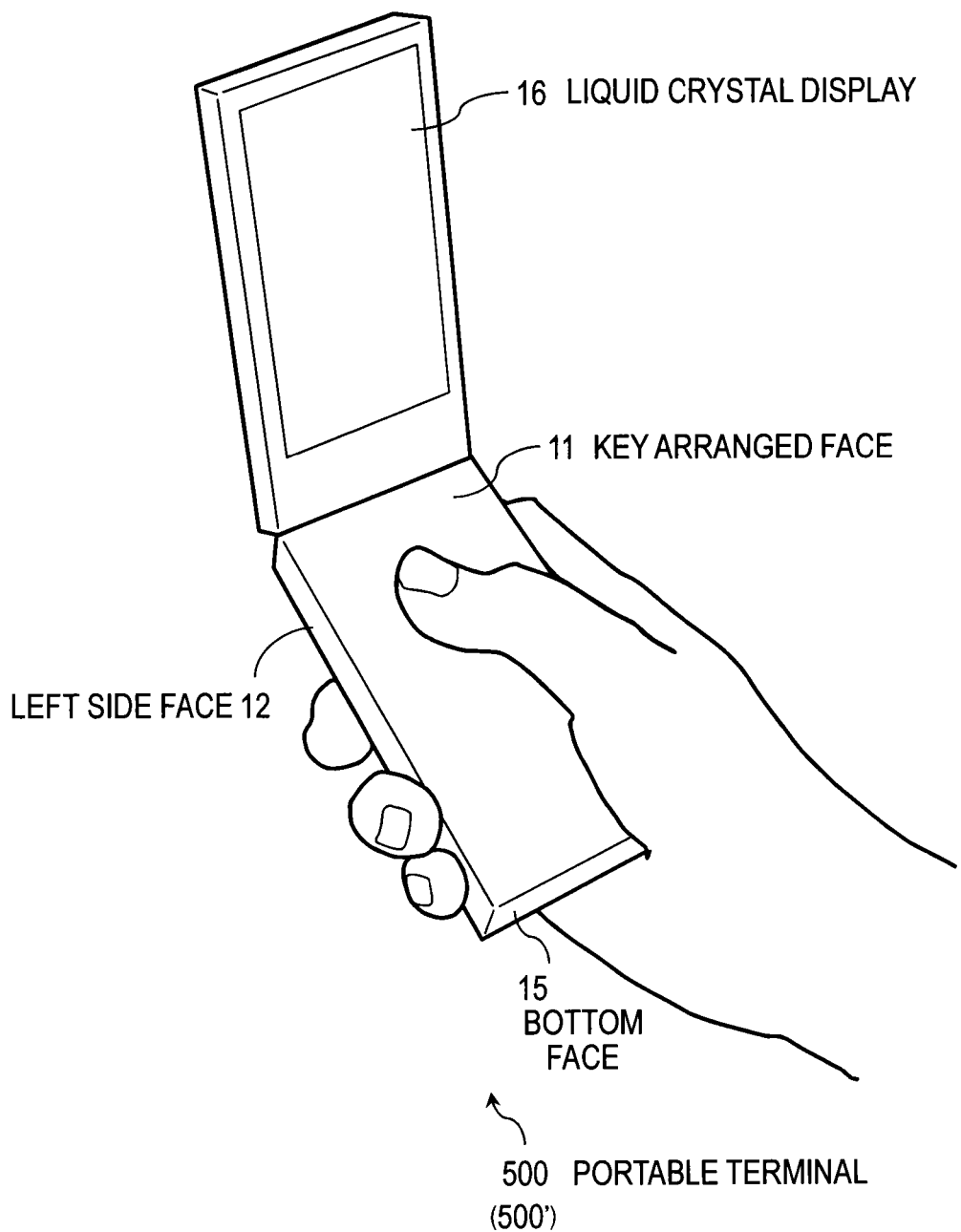
FIG. 1 illustrates a state of a gripped portable terminal according to all embodiments.

Embodiments of the present invention will be described in detail below. Constituent elements having the same functions as each other are given the same reference characters and duplicate description will be omitted.

<About Mobile Information Terminal>

Examples of a device embodying a mobile information terminal of the present invention include a portable terminal, a PDA, a portable game device, an electronic organizer, an electronic book reader, and the like. However, in addition to or in place of these devices, any other devices that meet requirements (1) through (3) given below can be used as mobile information terminals of the present invention: a device that (1) is used while being gripped and is capable of acquiring a gripping feature while being used, (2) is used while being carried and may be used in various terminal statuses (for example, an application of an active state, a motion state, and an operation posture), and (3) has a risk of leakage of personal information and value information due to loss or theft. In the following descriptions of embodiments, a portable terminal will be taken as a specific example and explained in detail.

<About Gripping-Feature Sample and Pressure Sensor Array>

Gripping-feature samples to be acquired by portable terminals 500 and 500', which will be described later, according to all embodiments of the present invention is first described. Since human beings are innately different in (1) the lengths of their fingers and (2) the strength of their gripping force and, as an acquired nature, in (3) the habit of gripping a portable terminal, gripping-features are extremely suitable as biometric information used for user authentication. More specifically, gripping-feature authentication has almost the same level of precision as general face authentication in terms of the false rejection rate and the false acceptance rate. Examples of a gripping-feature sample can include a gripping-pressure distribution, a gripping-shape distribution, and a gripping-heat distribution. As an example method of acquiring these gripping-feature samples, the gripping-pressure distribution can be acquired by distributing pressure sensors in an array on the portable terminals 500 and 500'. In the same manner, the gripping-shape distribution can be obtained by distributing CCD (CMOS) sensors in an array. In the same manner, the gripping-heat distribution can be obtained by distributing infrared sensors in an array. In a case of a portable terminal which has operating keys at the rear surface thereof (touch sensitive panel), gripping-features can be acquired even from the pressing states (whether the operating keys or the touch sensitive panel is pressed) of the operating keys (touch sensitive panel) when the terminal is gripped.

In description of embodiments, gripping-pressure distribution is taken as a specific example of a gripping-feature sample. Acquisition of gripping-pressure distribution by using a pressure sensor array will be described in detail with reference to FIG. 1 and FIG. 2. FIG. 1 illustrates a state in which the portable terminals 500 and 500' according to all embodiments are gripped. FIG. 2 illustrates gripping-pressure distribution outputted from a pressure sensor array arranged on surfaces of the portable terminals 500 and 500' according to all the embodiments. It is assumed here that the portable terminals 500 and 500' are general folding-type portable terminals. Two long-plate-shaped bodies are foldably coupled with a coupling shaft at short sides of the respective bodies. One of the bodies has operating keys arranged. A surface on which the operating keys are arranged is called a key arranged face 11, side faces at the left and right of the key arranged face 11 are called a left side face 12 and a right side face 13, a rear surface of the key arranged face 11 is called a rear face 14, and a side face of the key arranged face 11 at the bottom (face opposite to the face where the coupling shaft is placed) is called a bottom face 15. Further, a liquid crystal display 16 is provided in the other body on a surface facing the key arranged face 11 when the terminal is folded.

The portable terminals 500 and 500' are configured as described above, but the foregoing description explains merely an example for describing in detail the gripping-pressure distribution outputted from a pressure sensor array which is to be described later. Therefore, the portable terminals 500 and 500' are not necessarily folding-type terminals, such as that illustrated in FIG. 1, and can have any shapes, such as a straight type and a sliding type. Referring back to FIG. 1, it is assumed that a user of the portable terminals 500 and 500' grips the portable terminals 500 and 500' as depicted in FIG. 1. A pressure sensor array 105 (indicated by a dotted line in FIG. 2) is installed so as to be able to detect external gripping pressure, in the body where the key arranged face 11 of the portable terminals 500 and 500' is arranged. The pressure sensor array 105 is capable of detecting the gripping-pressure distribution on the left side face 12, the right side face 13, and the rear face 14 of the portable terminals 500 and 500'. When signals sent from respective pressure sensors of the pressure sensor array 105 are analyzed, gripping-pressure distribution such as that depicted in FIG. 2 can be drawn. It is understood from the gripping-pressure distribution depicted in FIG. 2 that characteristics of the fingers and the gripping force of the user are exhibited clearly on the left side face 12, the right side face 13, and the rear face 14. The gripping-pressure distribution acquired in this way can be used as gripping-feature samples used in the present invention.

<About Environmental Sensor Group>

Figure 3A:
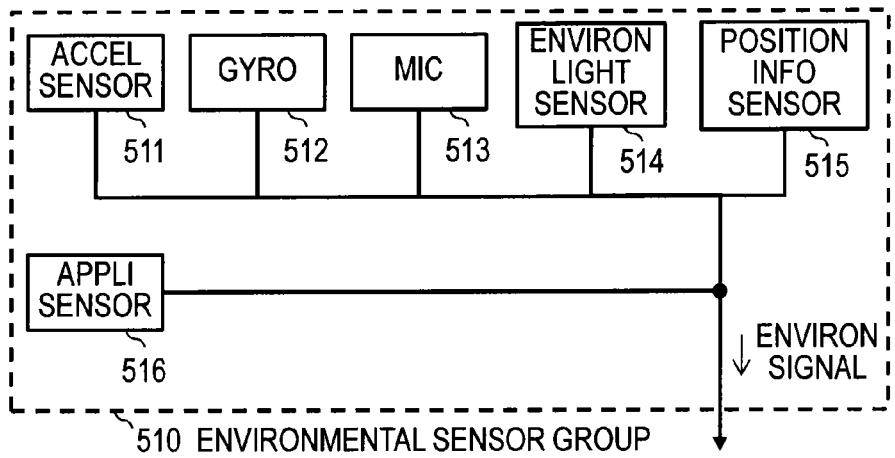
FIG. 3A illustrates a first example of an environmental sensor group incorporated in the portable terminal according to all the embodiments.
Figure 3B:
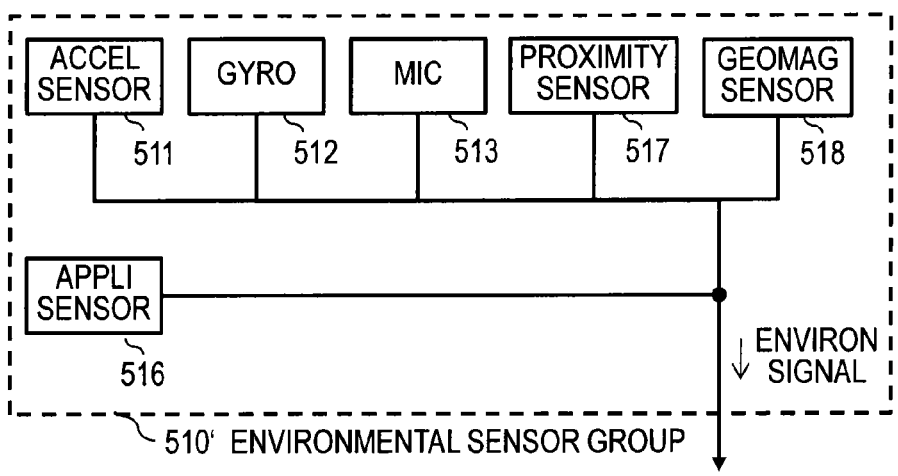
FIG. 3B illustrates a second example of an environmental sensor group incorporated in the portable terminal according to all the embodiments.
Figure 3C:
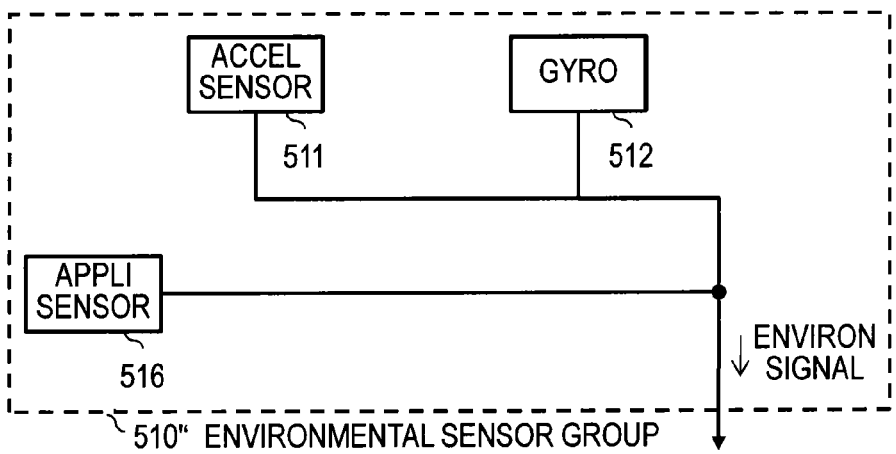
FIG. 3C illustrates a third example of an environmental sensor group incorporated in the portable terminal according to all the embodiments.

An environmental sensor group incorporated in the portable terminals 500 and 500' according to all the embodiments of the present invention will be described with reference to FIGS. 3A to 3C. Each of FIGS. 3A to 3C illustrates an example of an environmental sensor group which is incorporated in the portable terminals 500 and 500' according to all the embodiments. An environmental sensor group represents a sensor aggregation which is composed of one or more types of sensors for acquiring an environment to which the portable terminal belongs. In this invention, any sensors may be used as sensors of an environmental sensor group. Any types of sensors can be combined to the extent of the size and the cost at which the sensor can be implemented on the portable terminal. For example, a favorable environmental sensor group is an environmental sensor group 510. The environmental sensor group 510 is formed by assembling an acceleration sensor 511, a gyroscope 512, a microphone 513, an environmental light sensor 514, a position information sensor 515, and an application sensor 516.

A triaxial acceleration sensor, for example, is often implemented as the acceleration sensor 511 on the portable terminal. Examples of the triaxial acceleration sensor include a piezo-resistive triaxial acceleration sensor, a capacitance triaxial acceleration sensor, and a thermal detection triaxial acceleration sensor. A MEMS gyroscope, for example, is often implemented as the gyroscope 512 on the portable terminal. The micro electro mechanical systems (MEMS) represent a device obtained by integrating a sensor, an electronic circuit, and the like on one silicon substrate or the like. A small-sized microphone used separately from the one for calling is favorably provided as the microphone 513. As the environmental light sensor 514, a photo-transistor type small-sized illuminance sensor, for example, can be used. The position information sensor 515 represents a function for acquiring position information of the own device from a GPS satellite or a base station. Accordingly, the entity of the position information sensor 515 corresponds to an algorithm implementation circuit which transmits/receives radio waves. All of these sensors can be incorporated in a portable terminal and implementation of these sensors has especially progressed in smartphones and the like. Further, the application sensor 516 is used for detecting an active state of an application in a portable terminal, so that the entity of the application sensor 516 corresponds to the algorithm implementation circuit. As position information, the predetermined or smaller number of positions, in which a portable terminal is used, is registered in descending order of use frequencies by learning, for example.

As described above, any types of sensors can be combined or any one sensor can be used to the extent of the size and the cost at which the sensor can be implemented. Accordingly, not limited to the example of the environmental sensor group 510 described above, an environmental sensor group may be configured as an environmental sensor group 510', for example. The environmental sensor group 510' includes a proximity sensor 517 and a geomagnetic sensor 518 instead of the environmental light sensor 514 and the position information sensor 515 which are included in the environmental sensor group 510. Further, the number of types of sensors which constitute an environmental sensor group is not limited, so that an environmental sensor group may be composed of three types, in total, of sensors, for example, as an environmental sensor group 510". Information related to an environment to which the portable terminal belongs and which is detected by respective sensors constituting the environmental sensor group is outputted as an environmental signal from the environmental sensor group. Examples of an environmental signal include gravity direction information, vibration information, motion information, and shock detection information which are outputted from the acceleration sensor 511, angle information, angular velocity information, and angular acceleration information which are outputted from the gyroscope 512, and volume (level) information and frequency information which are outputted from the microphone 513. In this specification, the term "environmental signal" represents general signals for outputting environmental information which is obtained as a result of measurement of an environment by the above-described sensors.

<About Terminal Status>

A terminal status which is detected such that the portable terminals 500 and 500' according to all the embodiments of the present invention analyze the above-described environmental signal, will be described in detail with reference to FIG. 4. FIG. 4 illustrates terminal statuses which are detected by the portable terminals 500 and 500' according to all the embodiments. FIG. 4 shows types of terminal statuses in descending order, from left to right in a row direction, of magnitude of influence on a gripping feature and available states in each terminal status in a column direction. As described above, information on currently activated applications in the portable terminals 500 and 500' is outputted as environmental information from the application sensor 516. Examples activated applications include a browser function, a mail function, a call function, a menu function, a camera function, a game function, a schedule function, and a moving image browsing function. Accordingly, current usage states of applications by a user are found. These are each called an "active state application" in this specification and defined as one of types of terminal statuses. For the sake of simplicity of description, only six states which are (1) browser, (2) mail, (3) call, (4) menu, (5) camera, and (6) game are detected as active state application, in this specification. These six applications are given state numbers 1 to 6 in sequence respectively.

As described above, examples of environmental information outputted from the acceleration sensor 511 include gravity direction information, vibration information, shock detection information, and the like. Further, examples of environmental information include angle information, angular velocity information, and angular acceleration information which are outputted from the gyroscope 512. Circumference sound environmental information is outputted from the microphone 513. Analysis of these pieces of information shows whether a user of the portable terminals 500 and 500' is currently in a motionless state, is walking, is running, is descending stairs, is climbing stairs, is standing in a train, is sitting in the train, or the like. These are called "motion states" in this specification, and the motion state is one of types of the terminal statuses. For the sake of simplicity of description, only six states which are (1) motionless, (2) walking, (3) running, (4) stairs (descending), (5) stairs (climbing), and (6) train are detected as motion states in this description. These six states are given state numbers 1 to 6 in sequence respectively.

Further, analysis of environmental information outputted from the acceleration sensor 511 and the gyroscope 512 shows whether a user who operates the portable terminals 500 and 500' is in a posture of standing, sitting, lying down on his/her right or left side, lying on his/her back, lying on his/her stomach, or the like. These are called "operation postures" in this specification, and the operation posture is one of types of the terminal statuses. For the sake of simplicity of description, only five states which are (1) standing position, (2) sitting position, (3) lateral recumbent position, (4) supine position, and (5) procumbent position are detected as operation postures in this description. These five states are given state numbers 1 to 5 in sequence respectively.

Further, there is illuminance information as environmental information from the environmental light sensor 514. Analysis of illuminance information shows a level of brightness of an environment in which a user who operates the portable terminals 500 and 500' is present when the illuminance information is converted into a brightness scale which is defined by a threshold of perception of a human. These brightness scales which are defined by the threshold of perception of a human are called "brightness" in this specification, and the brightness is one of types of the terminal statuses. For the sake of simplicity of description, only five states which are (1) very bright, (2) slightly bright, (3) normal, (4) slightly dark, and (5) very dark are detected as brightness in this description. These five states are given state numbers 1 to 5 in sequence respectively.

Further, there is position information of the portable terminals 500 and 500' as environmental information outputted from the position information sensor. The position information of the portable terminals is called "position information" in this specification, and the position information is one of types of the terminal statuses. For the sake of simplicity of description, only three states which are (1) spot A, (2) spot B, and (3) spot C are detected as position information in this description. These three states are given state numbers 1 to 3 in sequence respectively.

Thus, a combination including each of five terminal statuses which are the active state application, the motion state, the operation posture, the brightness and the position information, is defined as one environmental state.

Here, it should be noted that the user's way of gripping the portable terminals 500 and 500' varies depending on the above-mentioned terminal status. For example, the user's way of gripping substantially varies when the user is texting, when the user is photographing by using a camera, and when the user is calling, even if the user is identical. Further, the user's way of gripping or a feature of gripping-pressure distribution which is acquired as a gripping-feature sample differs between an operation of the portable terminal in a motionless state and an operation of the portable terminal in a running state. The same goes for the operation posture. Further, the visibility of the operation keys of the portable terminals 500 and 500' differs in bright circumstances and in dark circumstances, slightly affecting the user's way of gripping. Further, the user's way of gripping the portable terminals 500 and 500' slightly varies between when the user operates the portable terminals 500 and 500' at a relaxed state in his/her home and when the user operates the portable terminals 500 and 500' in an official environment such as a company.

Thus, the user's way of gripping may vary depending on change in the terminal status. For example, change in the active state application largely affects the way of gripping, while change in the position information does not affect the way of gripping very much. Therefore, the five terminal statuses of environmental states are represented in decreasing order of magnitude of an influence on the way of gripping, for example, such as an order of the active state application, the motion state, the operation posture, the brightness, and the position information in the present invention. For example, a case of "returning a mail-walking-standing-slightly bright-spot A" is represented as an environmental state 2-2-1-2-1 by using the state numbers which are provided to respective terminal statuses. For example, a case of "browsing-in a train-sitting-normal brightness-spot B" is represented as an environmental state 1-6-2-3-2. Here, the motion state "walking" is not compatible with either the operation posture "sitting position" or "lateral recumbent position". Therefore, when an arbitrary state number No is denoted by a symbol "*", environmental state *-2-2-*-*, environmental state *-2-3-*-*, environmental state *-2-4-*-*, and environmental state *-2-5-*-* are not real environmental states. In a similar manner, the motion state "running" is not compatible with the operation postures "sitting position", "lateral recumbent position", and "supine position". Therefore, environmental state *-3-2-*-*, environmental state *-3-3-*-*, environmental state *-3-4-*-*, and environmental state *-3-5-*-* are not real environmental states. The same goes for environmental state *-4-2-*-*, environmental state *-4-3-*-*, environmental state *-4-4-*-*, environmental state *-4-5-*-*, environmental state *-5-2-*-*, environmental state *-5-3-*-*, environmental state *-5-4-*-*, and environmental state *-5-5-*-*.

<About User Authentication Template>

A user authentication template which is used in user authentication performed by a portable terminal according to all the embodiments of the present invention will be described in detail. A user authentication template is a model which represents a gripping feature of a user. A user authentication template is learned on the basis of an average value of the predetermined number of the above-mentioned gripping-feature samples which are acquired from a user. The learned user authentication template is collated with a gripping-feature sample which is newly acquired after learning. Whether the gripping-feature sample which is newly acquired after learning is a user authentication template of the same person is determined on the basis of a value which is obtained by the collation (Mahalanobis's generalized distance, for example). A gripping-feature sample required for learning of a user authentication template can be acquired simultaneously with generation of a sampling trigger.

Examples of a distance serving as a determination criterion for user authentication, described earlier, will be explained below. For example, a pressure value which is acquired by the i-th sensor element in the j-th measurement performed for learning is denoted as $x_{i,j}$. Here, $i=1, 2, \ldots, n$, $j=1, 2, \ldots, m$, n denotes the maximum number of sensor elements and is an integer equal to 2 or greater, and m denotes the maximum number of times of gripping-feature measurement for learning and is an integer equal to 2 or greater. An average of pressure values, variance, and vectors of the average and the variance are defined as follows:

$$\overline{x}_i = \frac{1}{m}\left(\sum_{j=1}^{m} x_{i,j}\right)$$

$$s_i^2 = \frac{1}{m}\sum_{j=1}^{m}(\overline{x}_i - x_{i,j})^2$$

$$X = (\overline{x}_1, \overline{x}_2, \ldots, \overline{x}_n); S^2 = (s_1^2, s_2^2, \ldots, s_n^2)$$

An average vector of the gripping-feature samples is used as a user authentication template. The user authentication template is indicated with a subscript "le". The Mahalanobis's generalized distance $f_1$ is expressed by the following formula.

$$f_1 = \left[\sum_{i=1}^{n}\left(\frac{x_i - {}_{le}\overline{x}_i}{s_i}\right)^2\right]^{1/2}$$

As another example of a distance, the Euclidean distance $f_2$ is defined by the following formula.

$$f_2 = \left[\sum_{i=1}^{n}(x_i - {}_{le}\overline{x}_i)^2\right]^{1/2}$$

As still another example of a distance, the Manhattan distance $f_3$ is defined by the following formula.

$$f_3 = \sum_{i=1}^{n}|x_i - {}_{le}\overline{x}_i|$$

These three distances can be used to perform determination with the following determination formula in common. Data of the user-to-be-authenticated, acquired for determination, is indicated with a subscript "self", and data of other people is indicated with a subscript "oth". When the threshold value used to determine other people is defined as $x_{thre}$, the following formula can be used to determine other people.

$$x_{ther} < {}_{oth}f$$

It is assumed here that gripping-feature sample data of other people is available in some method, such as embedding the data in the portable terminal in advance, allowing the user to access the data on the Internet, or allowing the user to acquire the data by asking other people to grip the portable terminal. From the data of other people and the user authentication template, the distance ${}_{oth}f$ is calculated. The threshold value $x_{thre}$ is determined to satisfy the following condition after the distance ${}_{self}f$ is calculated from a gripping-feature sample of the authentic user, not used for template learning, and the learned template.

$${}_{self}f < x_{thre} < {}_{oth}f$$

A sampling trigger is a timing at which a preliminarily-set gripping-feature sample is acquired. In the following example, every time it is detected that a decision key of a portable terminal is pressed in an arbitrary active state application, a sampling trigger in the corresponding environmental state is generated. However, a sampling trigger may be generated every time the decision key is pressed irrespective of the active state application, or a sampling trigger may be generated in response to pressing of the decision key in an arbitrary terminal status other than the active state application. Alternatively, a sampling trigger may be generated in response to pressing of a predetermined key other than the decision key in an arbitrary terminal status. In any case, in response to generation of a sampling trigger, a corresponding gripping-feature sample is acquired in a manner to correspond to an environmental state at the time.

When a gripping-feature sample in the active state of browser software of the portable terminals 500 and 500' is desired to be acquired, for example, a sampling trigger may be set as "during active state of browser∩decision key is pressed". This sampling trigger "during active state of browser∩decision key is pressed" means that when a browser is in an active state and a user has pressed the decision key of the portable terminals 500 and 500', a gripping-feature sample is immediately acquired in response to this operation detected as a sampling trigger. In a case in which a gripping-feature sample is desired to be acquired during calling in which an operation key such as the decision key is rarely pressed, a sampling trigger may be set as "once in three minutes", for example, and accordingly, sampling triggers may be automatically generated for every three-minute continuance of the calling state so as to acquire the gripping-feature sample.

Such acquisition of gripping-feature samples required for learning of a user authentication template by using sampling triggers exhibits the following advantages. When sampling triggers are used, gripping-feature samples are automatically acquired by using user's key operations, which are unconsciously performed by the user, as acquisition timings, so as to be accumulated. Accordingly, gripping-feature samples in the state in which the user is using the terminal in an unconscious and most natural state, that is, a state in which the user is relaxed, can be acquired, allowing to decrease distribution of observation values of gripping-feature samples. Further, when acquisition of gripping-feature samples is preliminarily informed, the user who is informed of the acquisition may poise and try to grip the portable terminal according to "the correct way of gripping" thought by the user without gripping the portable terminal in a normal way. Further, the user may lose his/her sight of the usual way of his/her gripping due to the reception of the informing, causing difficulty in acquisition of accurate gripping-feature samples. Therefore, if gripping-feature samples can be acquired in an unconscious state of the user as described above, the problems mentioned above can be solved and accurate gripping-feature samples can be acquired. Here, the description is provided on the assumption that a user authentication template is preliminarily stored in the portable terminal in the embodiments of the present invention and the portable terminals 500 and 500' of the present invention have a learning function of a user authentication template as described later.

As mentioned above, the way of gripping of the portable terminals 500 and 500' varies depending on terminal statuses. Accordingly, it is favorable that learning of a user authentication template is performed for every environmental state, an environmental state in which a gripping-feature sample is newly acquired is detected in user authentication, and a user authentication template which is learned under the same environmental state as the detected environmental state is used for collation. Therefore, it is favorable to learn the same number of user authentication templates as the number of environmental states. Hereinafter, a user authentication template which is acquired on the basis of gripping-feature samples by learning in each environmental state *-*-*-*-* will be represented by the same *-*-*-*-*. A user authentication template corresponding to an environmental state 2-1-1-3-2 (mail-motionless-standing position-normal-spot B), for example, is represented by 2-1-1-3-2, and a user authentication template corresponding to an environmental state 1-4-1-2-1 (browser-stairs (descending)-standing position-slightly bright-spot A), for example, is represented by 1-4-1-2-1.

<About Awake Mode, Partial Sleep Mode, and Sleep Mode>

Figure 5A:
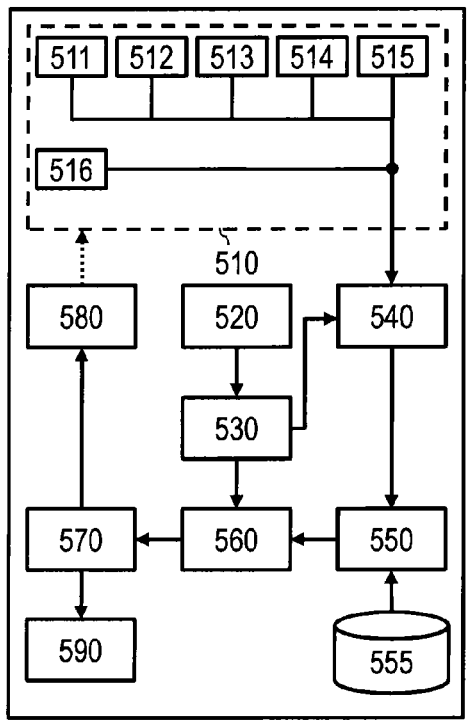
FIG. 5A illustrates a first example of an energization/halted-energization pattern in the portable terminal according to all the embodiments.
Figure 5B:
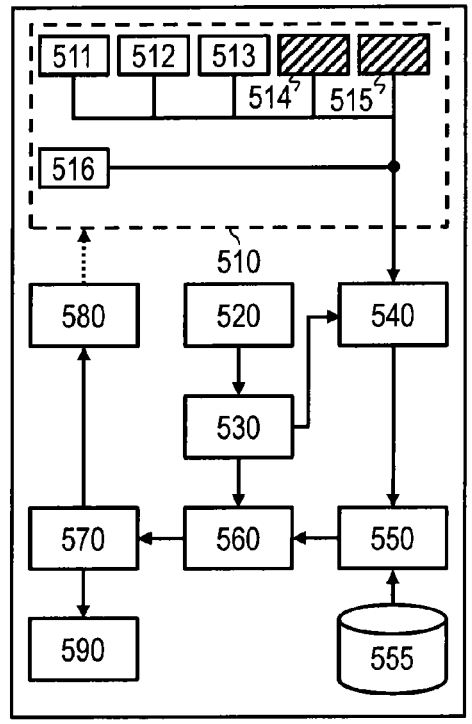
FIG. 5B illustrates a second example of an energization/halted-energization pattern in the portable terminal according to all the embodiments.
Figure 5C:
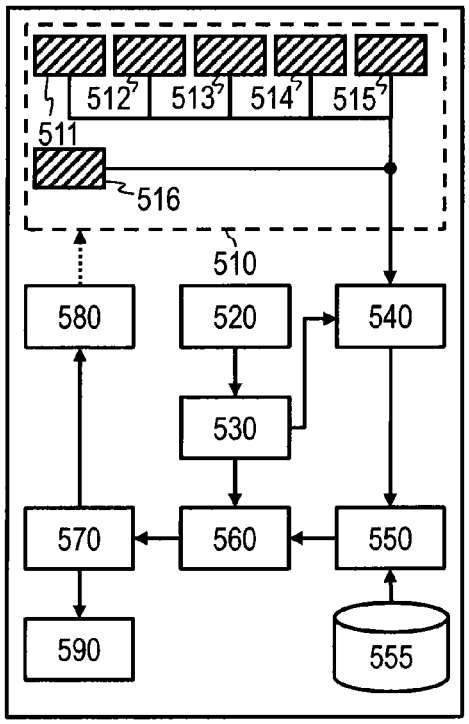
FIG. 5C illustrates a third example of an energization/halted-energization pattern in the portable terminal according to all the embodiments.
Figure 5D:
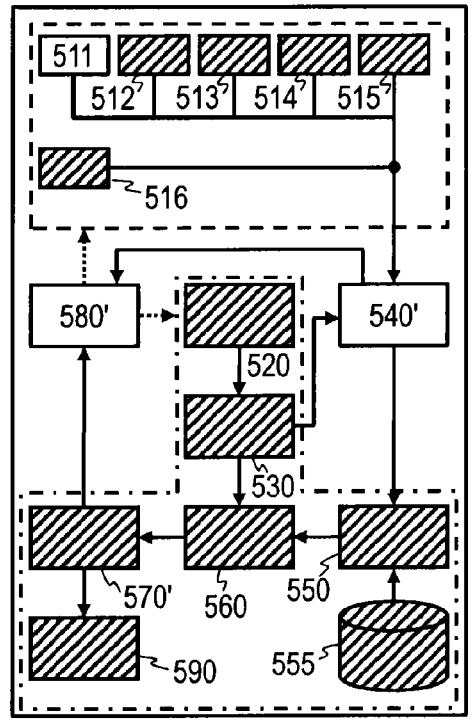
FIG. 5D illustrates a fourth example of an energization/halted-energization pattern in the portable terminal according to all the embodiments.
Figure 9:
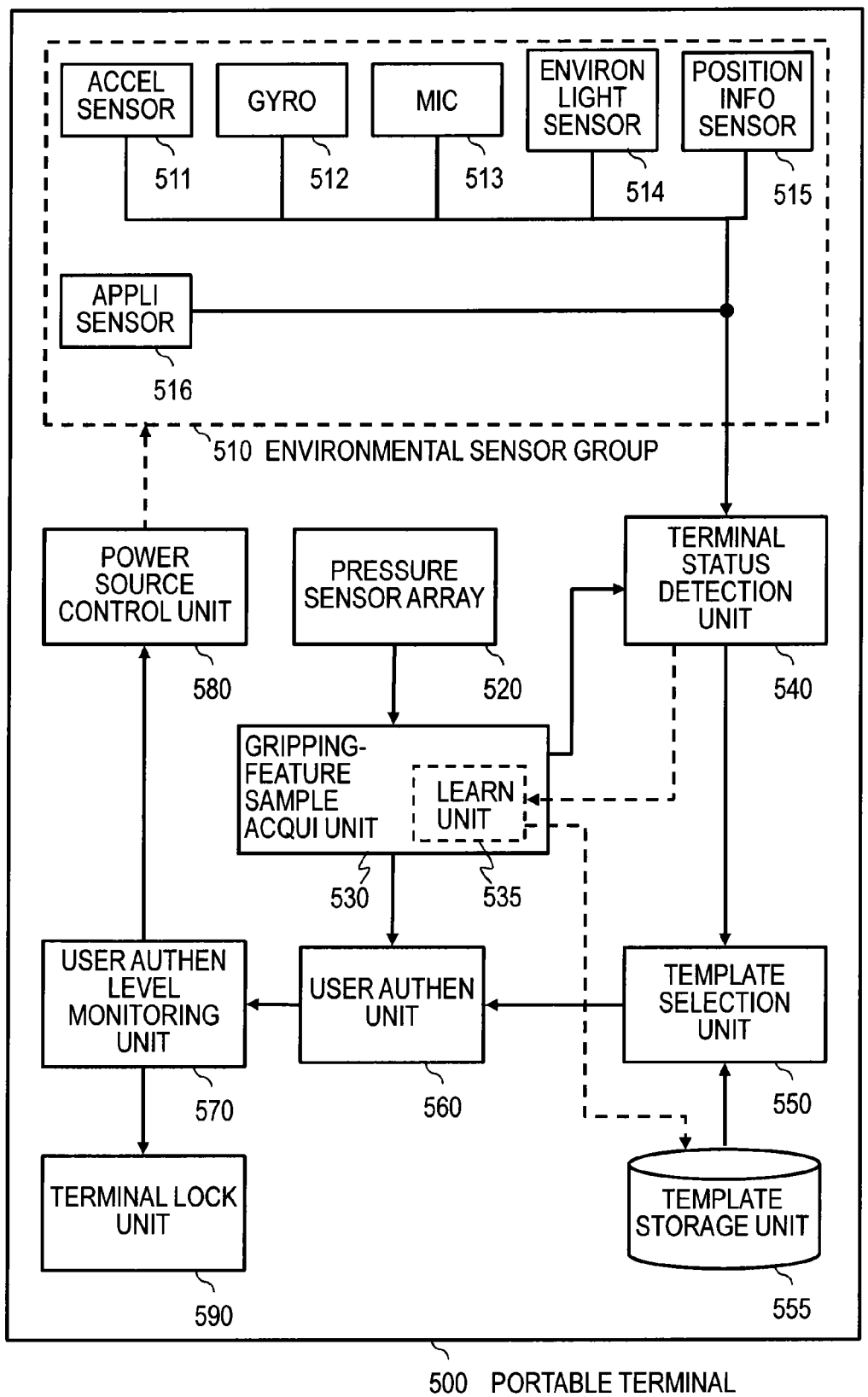
FIG. 9 is a block diagram illustrating the configuration of a portable terminal according to a first embodiment.
Figure 11:
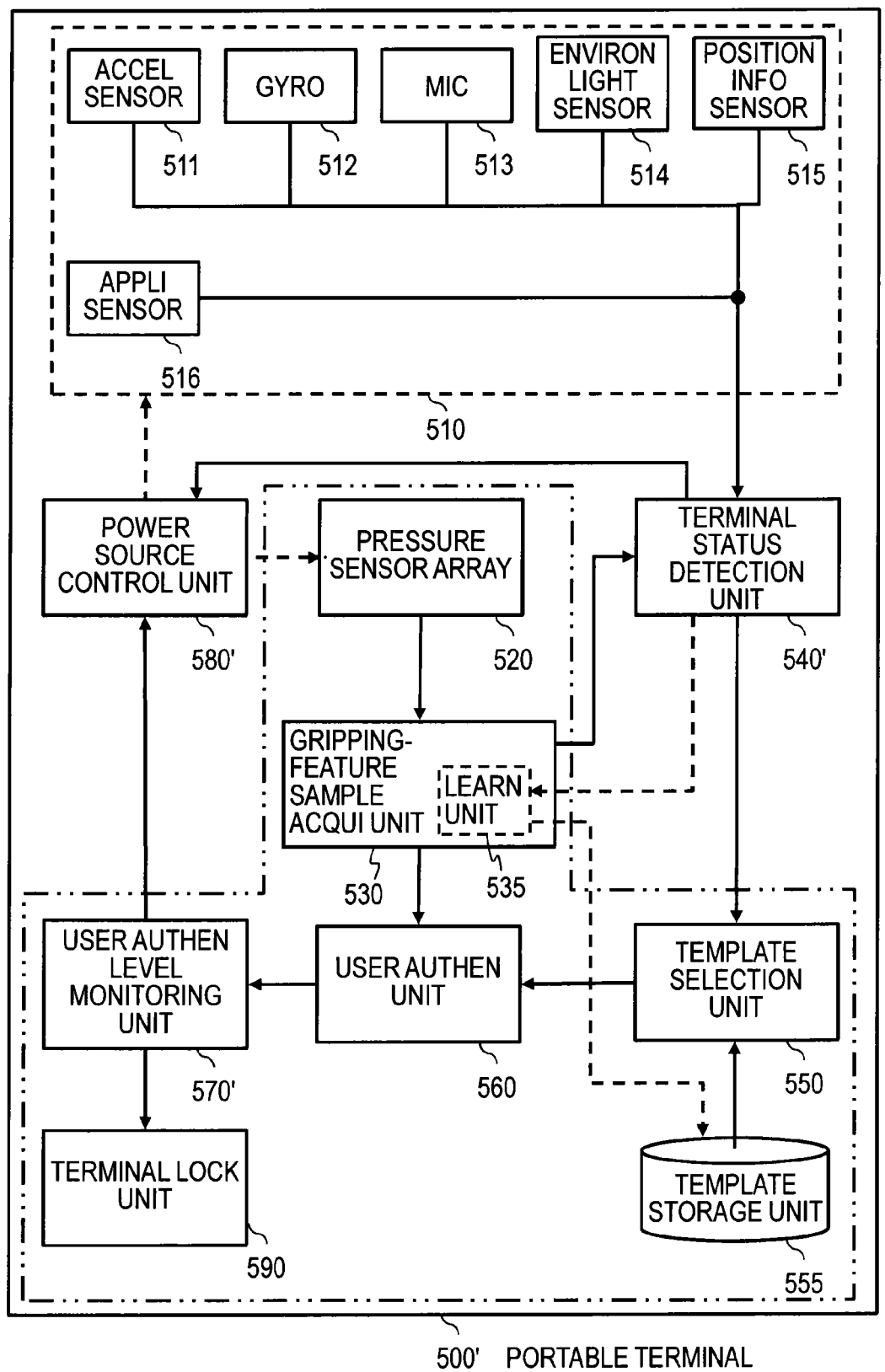
FIG. 11 is a block diagram illustrating the configuration of a portable terminal according to a second embodiment.

In the present invention, in order to realize power saving, energization to a sensor which satisfies prescribed conditions is halted to make the sensor be in a sleep mode, which will be described in detail later. This mode is described in detail with reference to FIGS. 5A, 5B, 5C, and 5D. FIGS. 5A, 5B, 5C, and 5D schematically illustrate four mode patterns in energization/halted-energization in the portable terminals 500 and 500' according to all the embodiments. FIG. 5A illustrates an awake mode, FIG. 5B illustrates a partial sleep mode, FIG. 5C illustrates a sleep mode, and FIG. 5D illustrates an advanced sleep mode. Blocks 511 to 516 in each of FIGS. 5A to 5D respectively represent the acceleration sensor 511, the gyroscope 512, the microphone 513, the environmental light sensor 514, the position information sensor 515, and the application sensor 516, which are depicted in FIG. 3A, as symbols. Blocks 520 to 550, 555, 560 to 590 in each of FIGS. 5A to 5C respectively represent a pressure sensor array 520, a gripping-feature sample acquisition unit 530, a terminal status detection unit 540, a template selection unit 550, a template storage unit 555, a user authentication unit 560, a user authenticity level monitoring unit 570, a power source control unit 580, and a terminal lock unit 590, which are depicted in FIG. 9 which will be described later, as symbols. Further, the blocks 520, 530, 550, 560, and 590 in FIG. 5D correspond to those of FIGS. 5A to 5C and blocks 540', 570', and 580' in FIG. 5D represent a terminal status detection unit 540', a user authenticity level monitoring unit 570', and a power source control unit 580', which are depicted in FIG. 11 which will be described later, as symbols.

First, the awake mode depicted in FIG. 5A is characterized in that all sensors (the acceleration sensor 511, the gyroscope 512, the microphone 513, the environmental light sensor 514, the position information sensor 515, and the application sensor 516) included in the above-described environmental sensor group 510 is in an energized state.

Sequentially, the partial sleep mode depicted in FIG. 5B is characterized in that energization to hatched parts among sensors included in the above-described environmental sensor group 510 is halted and other sensors are in the energized state. In the example of FIG. 5B, the acceleration sensor 511, the gyroscope 512, the microphone 513, and the application sensor 516 are in an energized state and the environmental light sensor 514 and the position information sensor 515 are in the energization-halted state. Next, the sleep mode depicted in FIG. 5C is characterized in that energization to all sensors included in the above-described environmental sensor group 510 is halted. The advanced sleep mode depicted in FIG. 5D represents a case in which energization not only to sensors but also to other function units is halted and the advanced sleep mode will be described in detail in a second embodiment.

<About User Authentication Template in Sleep Mode>

A user authentication template which is used in the partial sleep mode and the sleep mode will be described in detail in reference to FIG. 6.

FIG. 6 illustrates user authentication templates each fits to respective environmental states of the portable terminals 500 and 500' according to all the embodiments. As depicted in FIG. 6, energization to all sensors is halted in the sleep mode, for example, so that no environmental signal is outputted and therefore, there is no clue on an environmental state of the portable terminals 500 and 500'. A user authentication template which is used in this case is defined as "user authentication template *-*-*-*-*". Specific examples of the user authentication template *-*-*-*-* include the following templates.

For example, an environmental state of the portable terminals 500 and 500' immediately before energization to sensors is halted may be preliminarily stored and a user authentication template corresponding to the environmental state may be used. This method is simplest and most accurate. Further, stored use authentication templates may be weighted by larger coefficients in ascending order of usage frequency and an average of the weighted user authentication templates may be used. Further, only areas in which feature points of gripping-pressure distribution are common to each other among all stored user authentication templates may be used as a user authentication template and only information on a pressure sensor array existing in the areas may be used for collation with the user authentication template. Further, about 10 user authentication templates may be selected in descending order of usage frequency among stored user authentication templates and all of the selected authentication templates may be used for collation. In this case, user authentication can be performed by using the minimum value of Mahalanobis's generalized distances obtained by collation.

The same goes for a case of the partial sleep mode. Regarding a user authentication template 1-1-1-*-*, a user authentication template corresponding to the environmental state of the portable terminals 500 and 500' immediately before the energization to sensors is halted can be used, as depicted in FIG. 6, for example. Further, gripping-pressure distribution which is obtained by weighting the user authentication templates 1-1-1-1-1 to 1-1-1-5-3 depending on usage frequency and averaging the templates may be used, or only an area in which feature points of the gripping-pressure distribution are common to each other among the user authentication templates 1-1-1-1-1 to 1-1-1-5-3 may be used as the user authentication template. Further, five user authentication templates may be selected in descending order of usage frequency among the user authentication templates 1-1-1-1-1 to 1-1-1-5-3 and all of the selected user authentication templates may be used for collation.

Figure 7A:
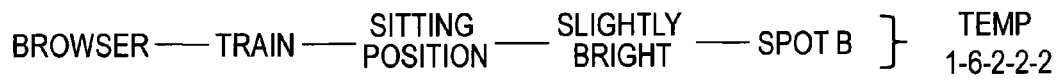
FIG. 7A illustrates an example of a user authentication template which is used when energization to part of sensors of the portable terminal according to all the embodiments is stopped.
Figure 7B:
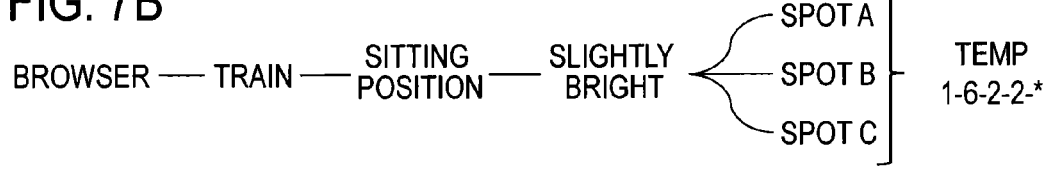
FIG. 7B illustrates another example of a user authentication template which is used when energization to part of sensors of the portable terminal according to all the embodiments is halted.
Figure 7C:
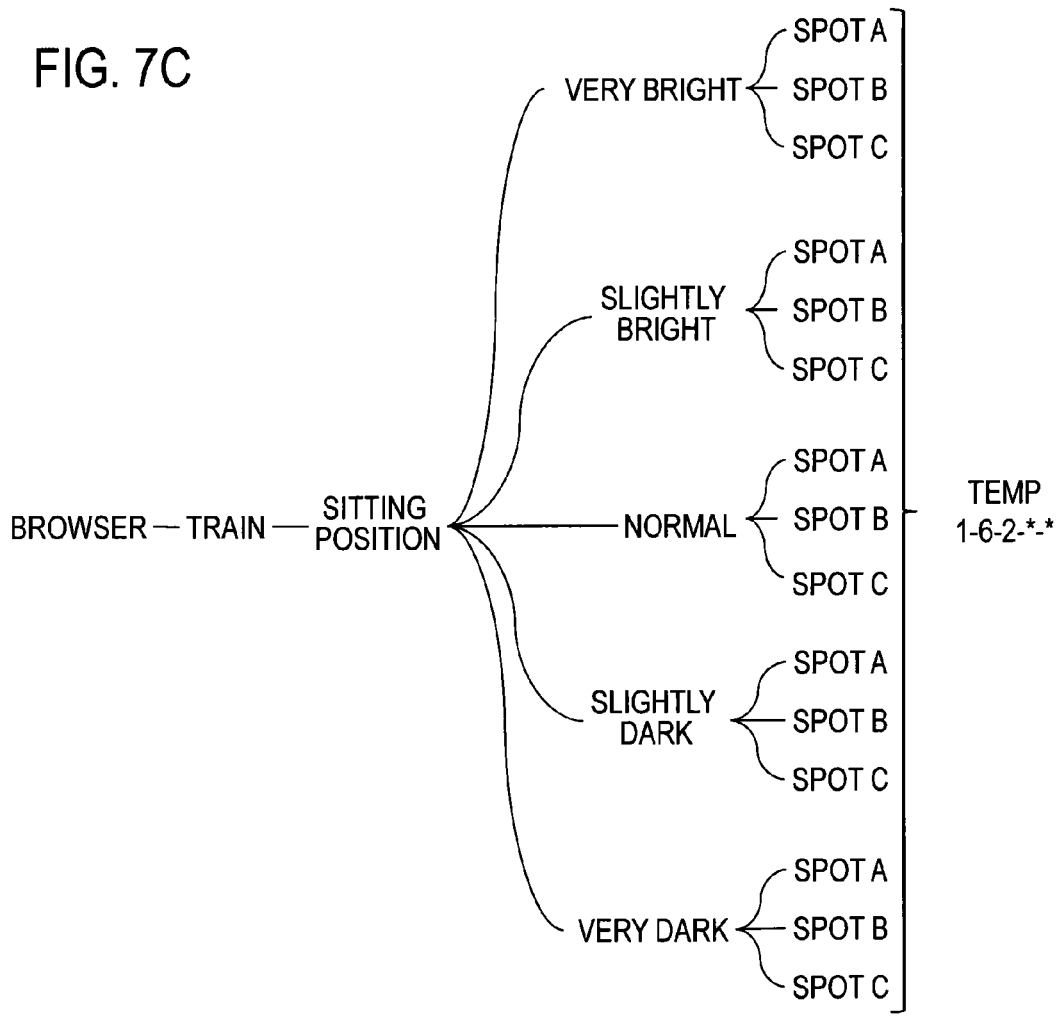
FIG. 7C illustrates still another example of a user authentication template which is used when energization to part of sensors of the portable terminal according to all the embodiments is halted.

An application example of a user authentication template which is used in the partial sleep mode will be described with reference to FIGS. 7A, 7B, and 7C. FIGS. 7A, 7B, and 7C illustrate user authentication templates which are used when energization to part of the sensors of the portable terminals 500 and 500' according to all the embodiments is halted. As depicted in FIG. 7A, a user authentication template used in a case in which the environmental state is browser(1)-train(6)-sitting position(2)-slightly bright(2)-spot B(2), for example, is a user authentication template 1-6-2-2-2. This user authentication template is obtained by learning by the method for acquiring a gripping-feature sample simultaneously with the above-described sampling trigger generation. On the other hand, when energization to the position information sensor 515 is halted, it becomes impossible to determine a spot in which the portable terminals 500 and 500' exist, among the spot A to the spot C, as depicted in FIG. 7B. In this case, a user authentication template 1-6-2-2-* is used. This user authentication template provides authentication using a template which is collaterally acquired by the above-described weighting average and the extraction of only an area in which feature points are common to each other, or using a user authentication template in the immediately preceding environmental state, or using part or all of the user authentication templates 1-6-2-2-1 to 1-6-2-2-3. In a similar manner, a user authentication template 1-6-2-*-* in FIG. 7C provides authentication using a template which is collaterally acquired by weighting average and the extraction of only an area in which feature points are common to each other, or using a user authentication template in the immediately preceding environmental state, or using part or all of the user authentication templates 1-6-2-1-1 to 1-6-2-5-3.

<About User Authenticity Level>

Subsequently, a user authenticity level which is used by the portable terminals 500 and 500' of the present invention will be described in detail. It is characteristically arranged such that the user authenticity level is increased when user authentication of the portable terminals 500 and 500' is successful and the user authenticity level is decreased when the user authentication is failed. As a user authenticity level, an authentication success rate in the last N times (N is an integer equal to or larger than 1) of user authentication, for example, may be used. It is assumed that the number of times of authentication is reset when a state in which the portable terminals 500 and 500' is not gripped is continued for a predetermined period of time. In a state in which the number of times of authentication is smaller than N times, an authentication success rate in all of the times of authentication is used. Accordingly, a fluctuation width of the user authenticity level is larger when the number of authentication is smaller, but the authentication success rate becomes stabilized as the number of times of authentication is increased. When N is too small, fluctuation of the authentication success rate is too large, rendering the user authenticity level unsuitable for actual use. When N is too large, the user authenticity level would become impervious with respect to change in the immediately preceding authentication success rate, rendering it unsuitable for actual use, as well. Accordingly, it is favorable that N is set to approximately 20 to 30. In addition to or in place of the above-described authentication success rate, a sum of the number of times of authentication success may be used as the user authenticity level. In this case, it is favorable to design such that when the number of times of authentication success reaches the predetermined upper limit, the following authentic success is not added and a user authenticity level is saturated at a predetermined value.

As described above, energization to a sensor which satisfies a predetermined condition, among the sensors of the environmental sensor group 510, is halted and the sensor transits to the sleep mode so as to realize power saving. This predetermined condition is determined on the basis of whether or not the user authenticity level exceeds a predetermined threshold value. Further, as described above, the active state application, the motion state, the operation posture, the brightness, and the position information, which are types of the terminal statuses, have different magnitudes of influence on the user's way of gripping. As described above, difference in the active state application largely affects the way of gripping. In comparison to this, the influence of difference in the position information on the way of gripping is smaller. Accordingly, threshold values can be set in a hierarchical state such that a small threshold value is set for the type of the terminal status which has a small influence on the way of gripping (for example, position information) and a large threshold value is set for the type of the terminal status which has a large influence on the way of gripping (for example, active state application).

Figure 8:
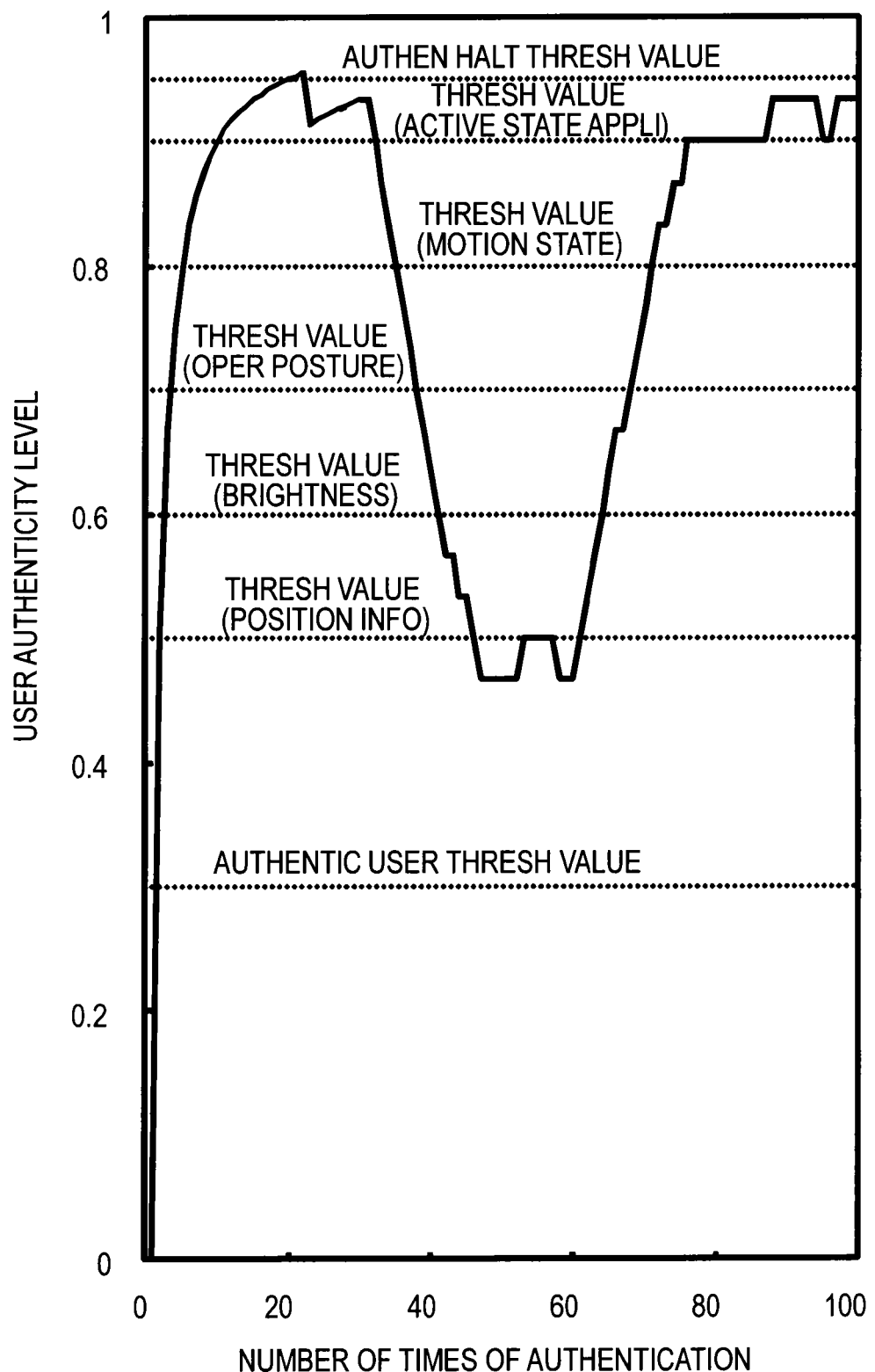
FIG. 8 illustrates a user authenticity level which is used by the portable terminal according to all the embodiments.

Change in the user authenticity level illustrated in FIG. 8 will be described while introducing a specific example. FIG. 8 illustrates a user authenticity level used by the portable terminals 500 and 500' according to all the embodiments. In the example of FIG. 8, an authentication success rate in the last 30 times of user authentication is used as a user authenticity level. In the example of FIG. 8, it is assumed that a user uses his/her smartphone (which is provided with a function of the portable terminal 500 of the present invention and is called the portable terminal 500 below) for a long period of time and browses websites (browser) in his/her home (assumed as the spot A) while lying on his/her back (supine position, motionless), and the illuminance of the circumstances of the user is approximately 400 1× (slightly bright). Accordingly, the environmental state is 1-1-4-2-1. Immediately after the user starts the above-mentioned use, a user authenticity level starts from 0 because the number of times of the user authentication which has been previously performed is reset. The portable terminal 500 is in the awake mode at this time. The portable terminal 500 selects a user authentication template 1-1-4-2-1 corresponding to the environmental state 1-1-4-2-1 so as to use the user authentication template 1-1-4-2-1 for the user authentication. In this example, the user himself/herself uses the portable terminal 500, so that the user authentication is successful in almost all cases. Accordingly, the user authenticity level increases sharply. When the user authenticity level passes through a threshold value (position information)=0.5 which is set to be minimum, energization to the position information sensor 515 which deals with position information is halted. It means that the portable terminal 500 transits to the partial sleep mode.

Subsequently, the portable terminal 500 continues the user authentication by using a user authentication template 1-1-4-2-*. Here, it is assumed that the user authentication template 1-1-4-2-1 which has been used in the environmental state immediately before the transition to the partial sleep mode as described above is continuously used as the user authentication template 1-1-4-2-*. It is assumed that the user authenticity level smoothly increases after that as well to reach a threshold value (brightness)=0.6 which is set to be the second lowest. At this time, energization to the environmental light sensor 514 which deals with brightness is halted.

Subsequently, the portable terminal 500 continues the user authentication by using a user authentication template 1-1-4-*-*. Here, it is assumed that the user authentication template 1-1-4-2-1 is continuously used as the user authentication template 1-1-4-*-* as described above. It is assumed that the user authenticity level smoothly increases after that as well to reach a threshold value (operation posture)=0.7 which is set to be the third lowest. At this time, the acceleration sensor 511, the gyroscope 512, and the microphone 513 which deal with the operation posture are used together in the motion state which is an upper terminal status as well, so that energization to these is not halted. Here, energization to the algorithm circuit which is used only for detection of the operation posture is halted.

Subsequently, the portable terminal 500 continues the user authentication by using a user authentication template 1-1-*-*-*. Here, it is assumed that the user authentication template 1-1-4-2-1 is continuously used as the user authentication template 1-1-*-*-* as described above. It is assumed that the user authenticity level further increases to reach a threshold value (motion state)=0.8 which is set to be the second highest. At this time, energization to the acceleration sensor 511, the gyroscope 512, and the microphone 513 which deal with the motion state is halted.

Subsequently, the portable terminal 500 continues the user authentication by using a user authentication template 1-*-*-*-*. Here, it is assumed that the user authentication template 1-1-4-2-1 is continuously used as the user authentication template 1-*-*-*-* as described above. It is assumed that the user authenticity level further increases to reach a threshold value (active state application)=0.9 which is set to be the highest. At this time, energization to the application sensor 516 which deals with the active state application is halted.

Subsequently, the portable terminal 500 continues the user authentication by using a user authentication template *-*-*-*-*. Here, it is assumed that the user authentication template 1-1-4-2-1 is continuously used as the user authentication template *-*-*-*-* as described above. It means that the environmental sensor group 510 of the portable terminal 500 transits to the sleep mode.

Thus, energization to respective sensors of the environmental sensor group 510 is halted in sequence in ascending order of degrees of importance (smaller influence on the way of gripping) as the user authenticity level rises, allowing to realize power saving while remaining the user authentication function. In the case of the above-described example, it is considered that a state in which the user is browsing while lying in his/her home is maintained and the portable terminal 500 turns OFF the sensors in sequence, achieving to largely reduce power required for the user authentication.

A case in which the user largely changes the terminal status and starts to use the portable terminal 500 after the portable terminal 500 transits to the sleep mode is now described by continuously taking the above-described specific example. As described above, the user has been browsing the websites while lying on his/her back in his/her home which is slightly bright for a long period of time, so that the portable terminal 500 has transited to the sleep mode. After that, the user leaves his/her home with the portable terminal 500 and starts to talk (call) with his/her friend while walking (walking, standing position) around a ticket wicket (assumed as the spot B) of the nearest station of his/her home. It is assumed that the illuminance of the circumstances of the user is approximately 900 1× (very bright). Accordingly, the environmental state is 3-2-1-1-2. Here, user authentication is continued by using the user authentication template 1-1-4-2-1 in a state in which it is considered that the portable terminal 500 is currently in the sleep mode and the user is browsing while lying in his/her home. Thus, the user authentication is performed by using the user authentication template 1-1-4-2-1 which is entirely different from the environmental state 3-2-1-1-2, so that the authentication success rate is naturally lowered. It is assumed that the user authenticity level is lowered along with the lowering of the authentication success rate so as to fall below a threshold value which is set to be the highest threshold value (active state application)=0.9. At this time, energization to the application sensor 516 which deals with the active state application is resumed. Accordingly, a new active state application "call (3)" is acquired.

Subsequently, the portable terminal 500 continues the user authentication by using the user authentication template 3-*-*-*-*. Here, the portable terminal 500 combines the active state application "call (3)" which is newly acquired and the environmental state 1-1-4-2-1 which has been acquired lastly and is a complete environmental state, to presume that the current environmental state is 3-1-4-2-1 and the corresponding user authentication template 3-1-4-2-1 be used as the user authentication template 3-*-*-*-*. It means that the portable terminal 500 transits to the partial sleep mode. It is assumed that the user authenticity level further lowers to fall below a threshold value (motion state)=0.8 which is set to be the second highest. At this time, energization to the acceleration sensor 511, the gyroscope 512, and the microphone 513 which deal with the motion state is resumed. Accordingly, a new motion state "walking (2)" is acquired.

Subsequently, the portable terminal 500 continues the user authentication by using the user authentication template 3-2-*-*-*. The portable terminal 500 combines the environmental state 3-2-*-*-* which is newly acquired and the environmental state 1-1-4-2-1 which has been acquired lastly and is a complete environmental state to presume that the current environmental state is 3-2-4-2-1 and the corresponding user authentication template 3-2-4-2-1 be used as the user authentication template 3-2-*-*-*, in a similar manner to the above description. It is assumed that the user authenticity level further lowers to fall below a threshold value (operation posture)=0.7 which is set to be the third highest. At this time, energization to the algorithm circuit which deals with the operation posture is resumed. Accordingly, a new operation posture "standing position (1)" is acquired.

Subsequently, the portable terminal 500 continues the user authentication by using the user authentication template 3-2-1-*-*. The portable terminal 500 combines the environmental state 3-2-1-*-* which is newly acquired and the environmental state 1-1-4-2-1 which has been acquired lastly and is a complete environmental state, to presume that the current environmental state is 3-2-1-2-1 and the corresponding user authentication template 3-2-1-2-1 be used as the user authentication template 3-2-1-*-*, in a similar manner to the above description. It is assumed that the user authenticity level further lowers to fall below a threshold value (operation posture)=0.6 which is set to be the second lowest. At this time, energization to the environmental light sensor 514 which deals with the brightness is resumed. Accordingly, new brightness "very bright (1)" is acquired.

Subsequently, the portable terminal 500 continues the user authentication by using the user authentication template 3-2-1-1-*. The portable terminal 500 combines the environmental state 3-2-1-1-* which is newly acquired and the environmental state 1-1-4-2-1 which has been acquired lastly and is a complete environmental state, to presume that the current environmental state is 3-2-1-1-1 and the corresponding user authentication template 3-2-1-1-1 be used as the user authentication template 3-2-1-1-*, in a similar manner to the above description. It is assumed that the user authenticity level further lowers to fall below a threshold value (position information)=0.5 which is set to be the lowest. At this time, energization to the position information sensor 515 which deals with the position information is resumed. It means that the portable terminal 500 transits to the awake mode. Thus, new position information "spot B (2)" is acquired.

Subsequently, the portable terminal 500 continues the user authentication by using the user authentication template 3-2-1-1-2. Accordingly, user authentication is performed by using the user authentication template 3-2-1-1-2 which completely fits to the environmental state 3-2-1-1-2, so that the user authenticity level rises again and the portable terminal 500 transits to the partial sleep mode again along with the raise of the user authenticity level so as to achieve power saving.

In the specific example referring to FIG. 8, the user authenticity level converts from lowering to rising only after the portable terminal 500 transits to the awake mode. In addition to or in replacement of this, a user authenticity level may reverse from lowering to rising in a case where accuracy is sufficiently secured even with a user authentication template which is selected in the partial sleep mode in which energization to only part of the sensors is resumed. For example, even if a user authentication template 3-2-*-*-* (3-2-4-2-1) which does not completely fit to the environmental state 3-2-1-1-2 in the above-described example, the user authenticity level reverses from lowering to rising at this time as long as the user authentication template 3-2-*-*-* is sufficiently similar to the user authentic template 3-2-1-1-2. Further, in the specific example referring to FIG. 8, the user himself/herself grips the portable terminal 500, but the portable terminal 500 is required to be locked in a case where people other than the user grips the portable terminal 500, for example. Therefore, the user authenticity level may be set to an authentic user threshold value and the portable terminal 500 may be locked when the user authenticity level varies to fall below the authentic user threshold value. In the example of FIG. 8, the authentic user threshold value is set to 0.3.

Thus, even if the user's way of gripping largely changes after the portable terminal 500 transits to the sleep mode or the partial sleep mode, the lowering of the user authenticity level caused by the change is detected and energization to the sensors, to which energization been halted in sequence, is resumed. Accordingly, user authentication following the environmental state can be realized and at the same time, power saving can be achieved.

First Embodiment

Figure 10:
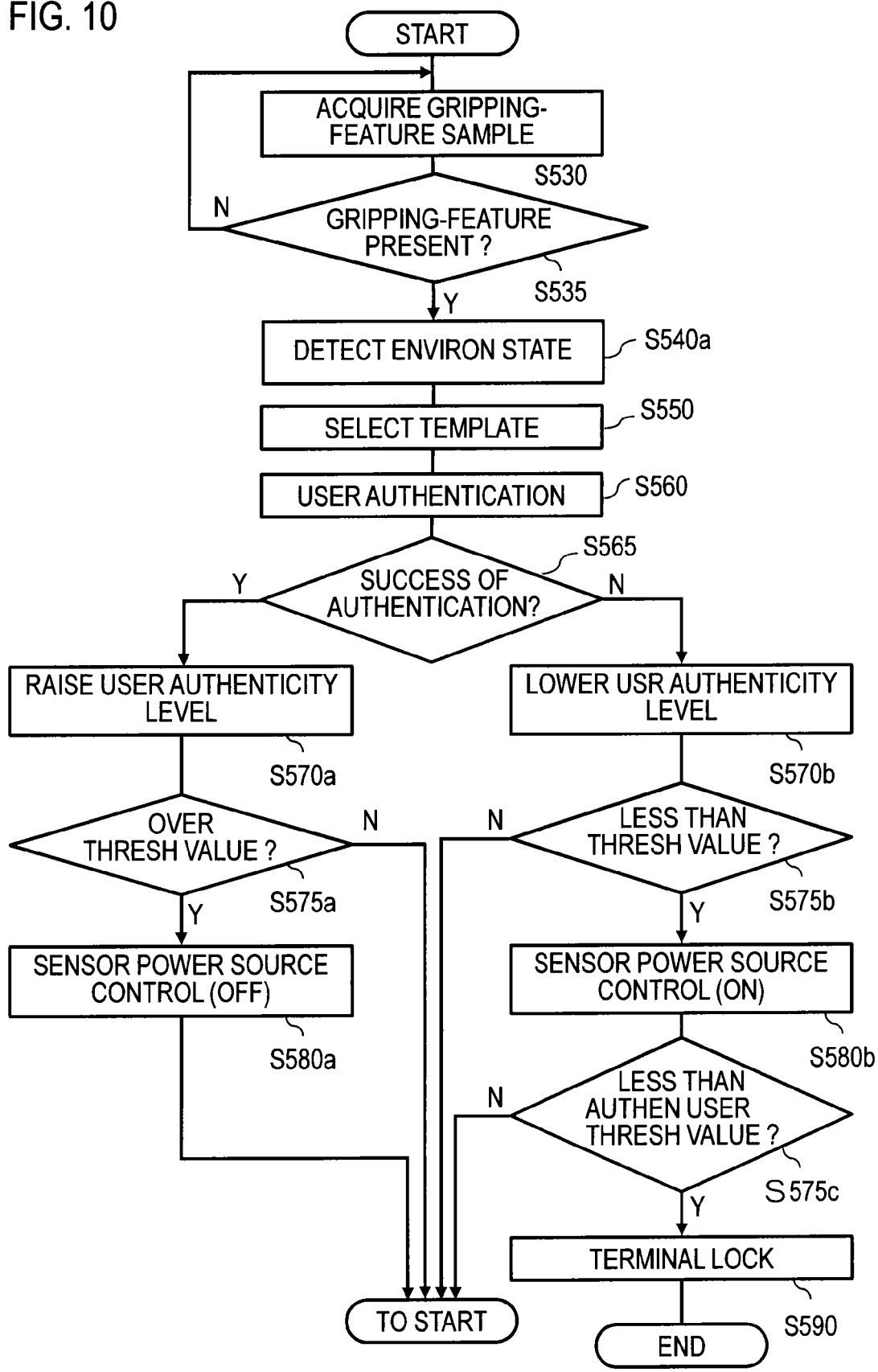
FIG. 10 is a flowchart illustrating an operation of the portable terminal according to the first embodiment.

The internal configuration and an operation of the portable terminal 500 according to a first embodiment will be described with reference to FIGS. 9 and 10. FIG. 9 is a block diagram illustrating the configuration of the portable terminal 500 according to the embodiment. FIG. 10 is a flowchart illustrating the operation of the portable terminal 500 according to the embodiment. The portable terminal 500 of the embodiment includes an environmental sensor group 510, a pressure sensor array 520, a gripping-feature sample acquisition unit 530, a terminal status detection unit 540, a template selection unit 550, a template storage unit 555, a user authentication unit 560, a user authenticity level monitoring unit 570, a power source control unit 580, and a terminal lock unit 590. As described above, the environmental sensor group 510 includes an acceleration sensor 511, a gyroscope 512, a microphone 513, an environmental light sensor 514, a position information sensor 515, and an application sensor 516. The gripping-feature sample acquisition unit 530 includes a learning unit 535 as depicted by a dashed line.

In the present invention, it is assumed that the portable terminal generates a user authentication template by learning on the basis of gripping-feature samples, which are preliminarily acquired in a learning mode, and stores the user authentication template in the template storage unit 555, and a power-saving operation utilizing the user authentication according to the present invention is executed in subsequent operations. The learning mode is first described simply. When the portable terminal is first used, the learning mode of the user authentication template is started by the learning unit 535 of the gripping-feature sample acquisition unit 530. In the learning mode, the gripping-feature sample acquisition unit 530 acquires a gripping-feature sample from the pressure sensor array 520 and provides the gripping-feature sample to the learning unit 535 every time a sampling trigger is generated. Further, five types of terminal statuses at that time are detected by the terminal status detection unit 540 on the basis of environmental information which is acquired by the environmental sensor group 510, so as to be provided to the learning unit 535 as environmental states. The learning unit 535 collects a predetermined number of gripping-feature samples for each of the environmental states and generates an average of the gripping-feature samples as a user authentication template for each of the environmental states as described above so as to store the user authentication template in the template storage unit 555. When generation of each user authentication template is ended, power-saving processing using a user authentication operation of the portable terminal according to the present invention is executed thereafter as the following.

The gripping-feature sample acquisition unit 530 acquires a gripping-feature sample (S530). When the gripping-feature sample acquisition unit 530 acquires the gripping-feature sample (S535Y), the terminal status detection unit 540 acquires an environmental signal to detect an environmental state of the portable terminal 500 (S540a). When a gripping-feature sample is not acquired, the processing returns to the start (S535N). The template selection unit 550 acquires the detected environmental state and selects a user authentication template fitting to the environmental state from the template storage unit 555 (S550). The user authentication unit 560 performs user authentication by collating the acquired gripping-feature sample with the selected user authentication template and outputs the user authentication result (S560).

The user authenticity level monitoring unit 570 acquires the user authentication result. When the user authentication result indicates a success of the authentication (S565Y), the user authenticity level monitoring unit 570 raises the user authenticity level (S570a). When the user authentication result indicates the failure of the authentication (S565N), the user authenticity level monitoring unit 570 lowers the user authenticity level (S570b). When the user authenticity level varies to exceed a threshold value predetermined for each sensor (S575aY), the user authenticity level monitoring unit 570 outputs a sensor power source OFF signal. When the user authenticity level varies to fall below the threshold value (S575bY), the user authenticity level monitoring unit 570 outputs a sensor power source ON signal. On the other hand, when the user authenticity level does not vary to exceed the threshold value (S575aN, S575bN), the processing returns to the start. When the power source control unit 580 acquires the sensor power source OFF signal, the power source control unit 580 halts energization to a sensor corresponding to the threshold value (S580a). When the power source control unit 580 acquires the sensor power source ON signal, the power source control unit 580 energizes a sensor corresponding to the threshold value (S580b). When the user authenticity level varies to fall below the predetermined authentic user threshold value (S575cY), the user authenticity level monitoring unit 570 outputs a terminal lock signal. When the terminal lock unit 590 acquires the terminal lock signal, the terminal lock unit 590 locks the portable terminal 500 (S590). When the user authenticity level does not fall below the predetermined authentic user threshold value (S575cN), the processing returns to the start.

The portable terminal 500 according to the embodiment is configured as described above. Thus, the portable terminal 500 is capable of energizing or halting energization to the sensors, which are included in the environmental sensor group 501, in accordance with the user authenticity level. Therefore, when the user authenticity level is high, the portable terminal 500 halts energization to the sensor, allowing to realize power saving. Further, when the user authenticity level is low, the sensors are energized to detect environmental states of the portable terminal 500 and user authentication can be performed by using a user authentication template fitting to each of the environmental states, allowing to realize user authentication following the environmental state.

Second Embodiment

Figure 12:
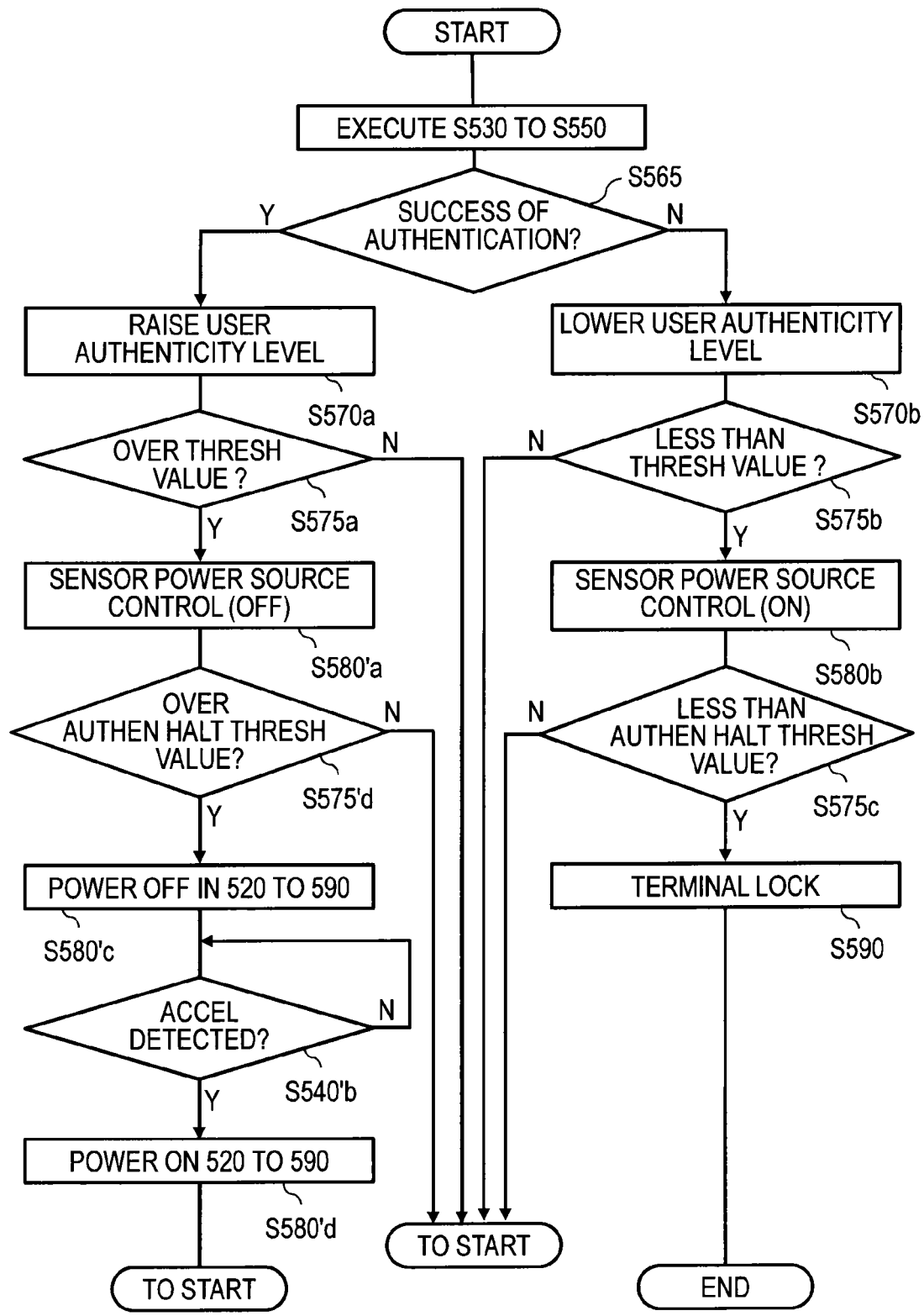
FIG. 12 is a flowchart illustrating an operation of the portable terminal according to the second embodiment.

The internal configuration and an operation of the portable terminal 500' according to a second embodiment which is obtained by further advancing a power-saving function of the portable terminal 500 of the first embodiment will be described with reference to FIGS. 11 and 12. FIG. 11 is a block diagram illustrating the configuration of the portable terminal 500' according to the embodiment. FIG. 12 is a flowchart illustrating the operation of the portable terminal 500' according to the embodiment. The portable terminal 500' of this embodiment is different from the portable terminal 500 of the first embodiment in that the terminal status detection unit 540, the user authenticity level monitoring unit 570, and the power source control unit 580 which are included in the portable terminal 500 of the first embodiment are replaced with a terminal status detection unit 540', a user authenticity level monitoring unit 570', and a power source control unit 580' in the portable terminal 500' of the second embodiment. Accordingly, description of constituent elements which are commonly used in the portable terminal 500 of the first embodiment and the portable terminal 500' of this embodiment and are provided with the same reference characters as each other will be skipped because the elements perform completely the same operations as each other.

In this embodiment, an authentication halt threshold value is newly provided. The authentication halt threshold value is characterized in that the authentication halt threshold value is set to have a value equal to or higher than the threshold value which is set to the highest (active state application), as illustrated in FIG. 8. When the user authenticity level varies to exceed the authentication halt threshold value (S575'dY), the user authenticity level monitoring unit 570' outputs an authentication halt signal. When the power source control unit 580' acquires the authentication halt signal, the power source control unit 580' halts energization to the pressure sensor array 520, the gripping-feature sample acquisition unit 530, the template storage unit 555, the template selection unit 550, the user authentication unit 560, the user authenticity level monitoring unit 570', and the terminal lock unit 590 and resumes energization to the acceleration sensor 511 (S580'c). This state is called the advanced sleep mode which is illustrated in FIG. 5D. The energization to the acceleration sensor 511 is resumed because a case in which large acceleration change is detected by the acceleration sensor is considered as a phenomenon in which a user changes the environmental state and the advanced sleep mode is ended to resume user authentication. Here, when the threshold value corresponding to the active state application is equal to the authentication halt threshold value, the mode directly transits from the partial sleep mode to the advanced sleep mode and thus, the sleep mode of FIG. 5C is not generated.

In the embodiment, energization to the acceleration sensor 511 is resumed. In addition to or in replacement of this, energization to the application sensor 516 may be resumed or energization to the gyroscope 512 may be resumed, for example. In the embodiment, description is continuously provided on the assumption that energization to the acceleration sensor 511 is resumed. When the terminal status detection unit 540' detects acceleration variation which is equal to or larger than a predetermined value from the acceleration sensor 511 (S540'bY) after the transition to the advanced sleep mode, energization to the pressure sensor array 520, the gripping-feature sample acquisition unit 530, the template storage unit 555, the template selection unit 550, the user authentication unit 560, the user authenticity level monitoring unit 570', and the terminal lock unit 590 is resumed (S580'd).

Thus, when the user authenticity level becomes extremely high to exceed the predetermined authentication halt threshold value, the portable terminal 500' of the embodiment halts energization to all constituent elements (520 to 590) which are used for the user authentication and resumes the energization to at least one sensor in the environmental sensor group to continue the monitoring. Thus, large reduction in power consumption can be realized in the advanced sleep mode. Further, when the terminal status varies, the portable terminal 500' can shift to the partial sleep mode and resume the user authentication. Thus, the user authentication following the environmental state and large power saving can be simultaneously achieved.

Each type of processing described above may be executed not only time sequentially according to the order in the description but also in parallel or individually when necessary or according to the processing capability of each apparatus that executes the processing. Appropriate changes can be made to the present invention without departing from the scope of the present invention.

When the configurations described above are implemented by a computer, the processing details of the functions that should be provided by each apparatus are described in a program. When the program is executed by the computer, the processing functions are implemented on the computer.

The program containing the processing details can be recorded in a computer-readable recording medium. The computer-readable recording medium can be any type of medium, such as a magnetic recording device, an optical disc, a magneto-optical recording medium, or a semiconductor memory.

The program is distributed by selling, transferring, or lending a portable recording medium, such as a DVD or a CD-ROM, with the program recorded on it, for example. The program may also be distributed by storing the program in a storage unit of a server computer and transferring the program from the server computer to another computer through a network.

A computer that executes this type of program first stores the program recorded on a portable recording medium or the program transferred from the server computer in its storage unit. Then, the computer reads the program stored in its storage unit and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the above-described processing may be executed by a so-called application service provider (ASP) service, in which the processing functions are implemented just by giving program execution instructions and obtaining the results without transferring the program from the server computer to the computer. The program of this form includes information that is provided for use in processing by the computer and is treated correspondingly as a program (something that is not a direct instruction to the computer but is data or the like that has characteristics that determine the processing executed by the computer).

In the description given above, each apparatus is implemented by executing the predetermined program on the computer, but at least a part of the processing may be implemented by hardware.

What is claimed is:

1. A mobile information terminal that acquires a gripping-feature sample when the mobile information terminal is gripped, so as to perform user authentication, comprising:
   a gripping-feature sample acquisition unit, implemented by circuitry, configured to acquire the gripping-feature sample;
   an environmental sensor group that includes one or more sensors that acquire environmental information on an environment to which the mobile information terminal belongs and output an environmental signal;
   a terminal status detection unit, implemented by the circuitry, configured to acquire the environmental signal and detect one or more combinations of terminal statuses of the mobile information terminal as environmental states;
   a template storage memory configured to store a user authentication template that fits to each of the environmental states;
   a template selection unit, implemented by the circuitry, configured to acquire the environmental state that is detected, so as to select a user authentication template that fits to the corresponding environmental state;
   a user authentication unit, implemented by the circuitry, configured to perform the user authentication by collating the gripping-feature sample that is acquired with the user authentication template that is selected, and output a corresponding user authentication result;
   a user authenticity level monitoring unit, implemented by the circuitry, configured to acquire the user authentication result, output a sensor power source OFF signal when a user authenticity level, which varies in accordance with the user authentication result, varies to exceed a threshold value that is predetermined to correspond to each sensor, and output a sensor power source ON signal when the user authenticity level varies to fall below the threshold value; and
   a power source control unit, implemented by the circuitry, configured to halt energization to a sensor that corresponds to the threshold value when the power source control unit acquires the sensor power source OFF signal, and energize a sensor that corresponds to the threshold value when the power source control unit acquires the sensor power source ON signal.

2. The mobile information terminal according to claim 1, further comprising:
   a terminal lock unit; wherein
   the user authenticity level monitoring unit is configured to output a terminal lock signal when the user authenticity level varies to fall below a predetermined authentic user threshold value, and
   the terminal lock unit is configured to lock the mobile information terminal when acquiring the terminal lock signal.

3. The mobile information terminal according to claim 1, wherein
   the user authenticity level monitoring unit is configured to output an authentication halt signal when the user authenticity level varies to exceed a predetermined authentication halt threshold value, and
   the power source control unit is configured to halt energization to at least one of the gripping-feature sample acquisition unit, the template storage memory, the template selection unit, the user authentication unit, and the user authenticity level monitoring unit when acquiring the authentication halt signal.

4. The mobile information terminal according to claim 3, wherein the power source control unit is configured to cause one of the sensors included in the environmental sensor group to be in an energized state when halting the energization to at least one of the gripping-feature sample acquisition unit, the template storage memory, the template selection unit, the user authentication unit, and the user authenticity level monitoring unit, and to energize the gripping-feature sample acquisition unit, the template storage memory, the template selection unit, the user authentication unit, and the user authenticity level monitoring unit when an environmental signal outputted by the sensor in the energized state varies over a predetermined value.

5. The mobile information terminal according to claim 2, wherein
   the user authenticity level monitoring unit is configured to output an authentication halt signal when the user authenticity level varies to exceed a predetermined authentication halt threshold value, and
   the power source control unit is configured to halt energization to at least one of the gripping-feature sample acquisition unit, the template storage memory, the template selection unit, the user authentication unit, and the user authenticity level monitoring unit when acquiring the authentication halt signal.

6. The mobile information terminal according to claim 5, wherein the power source control unit is configured to make one of sensors included in the environmental sensor group be in an energized state when halting the energization to at least one of the gripping-feature sample acquisition unit, the template storage memory, the template selection unit, the user authentication unit, and the user authenticity level monitoring unit, and to energize the gripping-feature sample acquisition unit, the template storage memory, the template selection unit, the user authentication unit, and the user authenticity level monitoring unit when an environmental signal outputted by the sensor in the energized state varies over a predetermined value.

7. The mobile information terminal according to any one of claims 1 to 4, 5 or 6, wherein the environmental sensor group includes at least an application sensor that acquires an active state application of the mobile information terminal as a part of the environmental information, and an acceleration sensor that detects acceleration that is applied to the mobile information terminal as a part of the environmental information.

8. A gripping-feature authentication method in which user authentication is performed by acquiring a gripping-feature sample when a mobile information terminal is gripped, comprising:
   a gripping-feature sample acquisition step in which the gripping-feature sample is acquired by circuitry of the mobile information terminal;
   a terminal status detection step in which an environmental signal is acquired from an environmental sensor group, the environmental sensor group including one or more sensors that acquire environmental information to which the mobile information terminal belongs and output the environmental signal, and one or more combinations of terminal statuses of the mobile information terminal are detected as environmental states;
   a template selection step in which the environmental state that is detected is acquired and a user authentication template that fits to the environmental state is selected from user authentication templates that are stored in a template storage unit;

a user authentication step in which the user authentication is performed by the circuitry by collating the gripping-feature sample that is acquired with the user authentication template that is selected and a corresponding user authentication result is outputted;

a user authenticity level monitoring step in which the user authentication result is acquired, a sensor power source OFF signal is outputted when a user authenticity level, which varies in accordance with the user authentication result, varies to exceed a threshold value that is predetermined to correspond to each sensor, and a sensor power source ON signal is outputted when the user authenticity level varies to fall below the threshold value; and a power source control step in which energization to a sensor that corresponds to the threshold value is halted by the circuitry when the sensor power source OFF signal is acquired, and a sensor that corresponds to the threshold value is energized by the circuitry when the sensor power source ON signal is acquired.

9. The gripping-feature authentication method according to claim 8, further comprising:
a terminal lock step; wherein
a terminal lock signal is outputted when the user authenticity level varies to fall below a predetermined authentic user threshold value in the user authenticity level monitoring step, and
the mobile information terminal is locked when the terminal lock signal is acquired in the terminal lock step.

10. The gripping-feature authentication method according to claim 8, wherein
an authentication halt signal is outputted when the user authenticity level varies to exceed a predetermined authentication halt threshold value, in the user authenticity level monitoring step, and
energization to at least one of circuits of the circuitry that execute the gripping-feature sample acquisition step, the template storage unit, the template selection step, the user authentication step, and the user authenticity level monitoring step is halted when the authentication halt signal is acquired, in the power source control step.

11. The gripping-feature authentication method according to claim 10, wherein at least one of the sensors included in the environmental sensor group is in an energized state when energization to at least one of circuits that execute the gripping-feature sample acquisition step, the template storage unit, the template selection step, the user authentication step, and the user authenticity level monitoring step is halted, and the circuits that execute the gripping-feature sample acquisition step, the template storage unit, the template selection step, the user authentication step, and the user authenticity level monitoring step are energized when an environmental signal outputted by the sensor in the energized state varies over a predetermined value, in the power source control step.

12. The gripping-feature authentication method according to claim 9, wherein
an authentication halt signal is outputted when the user authenticity level varies to exceed a predetermined authentication halt threshold value, in the user authenticity level monitoring step, and
energization to at least one of circuits of the circuitry that execute the gripping-feature sample acquisition step, the template storage unit, the template selection step, the user authentication step, and the user authenticity level monitoring step is halted when the authentication halt signal is acquired, in the power source control step.

13. The gripping-feature authentication method according to claim 12, wherein at least one of the sensors included in the environmental sensor group is in an energized state when energization to the at least one of the circuits that execute the gripping-feature sample acquisition step, the template storage unit, the template selection step, the user authentication step, and the user authenticity level monitoring step is halted, and the circuits that execute the gripping-feature sample acquisition step, the template storage unit, the template selection step, the user authentication step, and the user authenticity level monitoring step are energized when an environmental signal outputted by the sensor in the energized state varies over a predetermined value, in the power source control step.

14. The gripping-feature authentication method according to any one of claims 8 to 11, 12 or 13, wherein the environmental sensor group includes at least an application sensor that acquires an active state application of the mobile information terminal and an acceleration sensor that detects acceleration that is applied to the mobile information terminal, and the active state application and the acceleration are detected as a part of the environmental information in the terminal status detection step.

15. The non-transitory computer-readable medium according to claim 8, further comprising:
a terminal lock step; wherein
a terminal lock signal is outputted when the user authenticity level varies to fall below a predetermined authentic user threshold value in the user authenticity level monitoring step, and
the mobile information terminal is locked when the terminal lock signal is acquired in the terminal lock step.

16. The non-transitory computer-readable medium according to claim 8, wherein
an authentication halt signal is outputted when the user authenticity level varies to exceed a predetermined authentication halt threshold value, in the user authenticity level monitoring step, and
energization to at least one of circuits of the circuitry that execute the gripping-feature sample acquisition step, the template storage unit, the template selection step, the user authentication step, and the user authenticity level monitoring step is halted when the authentication halt signal is acquired, in the power source control step.

17. The non-transitory computer-readable medium according to claim 16, wherein at least one of the sensors included in the environmental sensor group is in an energized state when energization to at least one of circuits that execute the gripping-feature sample acquisition step, the template storage unit, the template selection step, the user authentication step, and the user authenticity level monitoring step is halted, and the circuits that execute the gripping-feature sample acquisition step, the template storage unit, the template selection step, the user authentication step, and the user authenticity level monitoring step are energized when an environmental signal outputted by the sensor in the energized state varies over a predetermined value, in the power source control step.

18. A non-transitory computer-readable medium that is readable by a computer in which a program for causing the computer to perform a gripping-feature authentication method in which user authentication is performed by acquiring a gripping-feature sample when a mobile information terminal is gripped, the method comprising:
a gripping-feature sample acquisition step in which the gripping-feature sample is acquired;

a terminal status detection step in which an environmental signal is acquired from an environmental sensor group, the environmental sensor group including one or more sensors that acquire environmental information to which the mobile information terminal belongs and output the environmental signal, and one or more combinations of terminal statuses of the mobile information terminal are detected as environmental states;

a template selection step in which the environmental state that is detected is acquired and a user authentication template that fits to the environmental state is selected from user authentication templates that are stored in a template storage unit;

a user authentication step in which the user authentication is performed by collating the gripping-feature sample that is acquired with the user authentication template that is selected and a corresponding user authentication result is outputted;

a user authenticity level monitoring step in which the user authentication result is acquired, a sensor power source OFF signal is outputted when a user authenticity level, which varies in accordance with the user authentication result, varies to exceed a threshold value that is predetermined to correspond to each sensor, and a sensor power source ON signal is outputted when the user authenticity level varies to fall below the threshold value; and a power source control step in which energization to a sensor that corresponds to the threshold value is halted when the sensor power source OFF signal is acquired, and a sensor that corresponds to the threshold value is energized when the sensor power source ON signal is acquired.

* * * * *